United States Patent
Lu et al.

(10) Patent No.: US 10,761,202 B2
(45) Date of Patent: Sep. 1, 2020

(54) OCCUPANCY DETECTION IN A RADIO FREQUENCY WIRELESS COMMUNICATION NETWORK

(71) Applicant: ABL IP HOLDING LLC, Conyers, GA (US)

(72) Inventors: Yenpao Lu, Cumming, GA (US); Min-Hao Michael Lu, Castro Valley, CA (US); Michael Miu, Castro Valley, CA (US)

(73) Assignee: ABL IP HOLDING LLC, Conyers, GA (US)

( * ) Notice: Subject to any disclaimer, the term of this patent is extended or adjusted under 35 U.S.C. 154(b) by 322 days.

(21) Appl. No.: 15/897,678

(22) Filed: Feb. 15, 2018

(65) Prior Publication Data

US 2019/0250265 A1 Aug. 15, 2019

(51) Int. Cl.
*G01S 13/00* (2006.01)
*G01S 13/56* (2006.01)

(52) U.S. Cl.
CPC ............ *G01S 13/56* (2013.01); *G01S 13/003* (2013.01)

(58) Field of Classification Search
CPC ......... G01S 13/003; G01S 13/56; G01S 3/781
See application file for complete search history.

(56) References Cited

U.S. PATENT DOCUMENTS

| | | |
|---|---|---|
| 9,474,042 B1 | 10/2016 | Wootton et al. |
| 9,711,047 B1 | 7/2017 | Knas et al. |
| 9,711,048 B1 | 7/2017 | Knas et al. |
| 9,721,451 B1 | 8/2017 | Knas et al. |
| 9,741,237 B1 | 8/2017 | Knas et al. |
| 9,877,266 B1 | 1/2018 | Knas et al. |
| 9,877,298 B1 | 1/2018 | Knas et al. |
| 9,881,484 B1 | 1/2018 | Knas et al. |
| 9,949,091 B1 | 4/2018 | Knas et al. |
| 9,984,556 B1 | 5/2018 | Knas et al. |
| 2014/0119160 A1 | 5/2014 | Shilling et al. |
| 2016/0294492 A1 | 10/2016 | Mostofi et al. |
| 2016/0379475 A1* | 12/2016 | Zack ................ G01S 13/62 342/21 |

OTHER PUBLICATIONS

Nordic Semiconductor: nRF51822—Multi-protocol Bluetooth Low Energy and 2.4 Hz proprietary system on a chip, document printed Aug. 10, 2017 (2 pages).

* cited by examiner

*Primary Examiner* — Timothy A Brainard
(74) *Attorney, Agent, or Firm* — RatnerPrestia

(57) ABSTRACT

The disclosure provides an example of a system including a radio frequency (RF) wireless communication network (network) including a plurality of nodes in an area and a computer coupled to the network. Each of the nodes includes a transmitter and a receiver. At plurality of times, each transmitter transmits RF spectrum signals (signals) and each receiver receives the signals and also generates an indicator data of a signal characteristic of the received signal propagated in the network. When each time among the plurality of times is a current time, the computer obtains the indicator data of the signal, determines a modification in the indicator data at the current time from the indicator data at a preceding time due to a movement of an occupant in the area and detect an occupancy condition in the area based on the modification in the indicator data and a parameter of a configuration of the network.

20 Claims, 14 Drawing Sheets

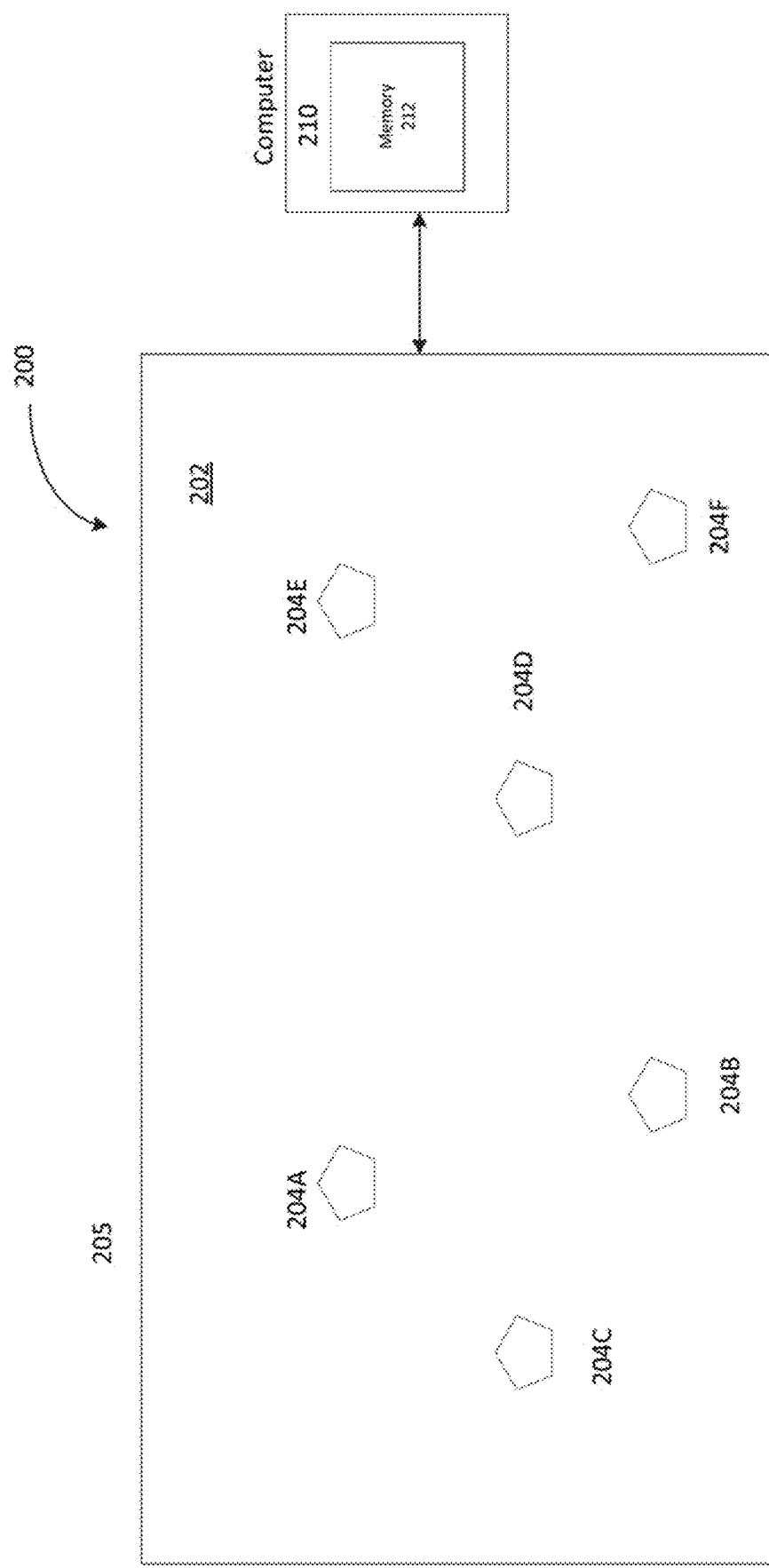

OCCUPANCY DETECTION IN A RADIO FREQUENCY WIRELESS COMMUNICATION NETWORK

TECHNICAL FIELD

The present subject matter relates to methods, systems and apparatuses for an occupancy detection in a radio frequency (RF) wireless communication network utilizing properties of the RF transceiver in the RF wireless communication network.

BACKGROUND

Information about the occupancy of a given finite area can have many uses, from safety enhancement to marketing science. Here, an "occupant" is typically a person but can also be an animal, a mobile machine, or any changeable aspect of the finite area that affects radio propagation and that it may be desirable to sense. Sensed occupancy information can vary in completeness and value: e.g., one may estimate the total number of occupants at a given time, estimate statistical aspects of occupants' movements over time, or estimate tracking the movements of occupants over time.

Occupancy has been measured by manual count (e.g., at venue entrance), computer vision systems, electric-eye counters, and other methods. In recent years, a number of systems and methods have been proposed for occupancy detection within a particular area utilizing radio frequency (RF) based technologies. Examples of such systems include video sensor monitoring systems, radio frequency identification (RFID) systems, global positioning systems (GPS), and wireless communication systems among others. However, many of these systems have several disadvantages. For example, the video sensor monitoring system requires a considerable number of dedicated sensors that are expensive and the system requires a large amount of memory for storing data. The RFID systems rely on occupants carrying an RFID tag/card that can be sensed by the RFID system to monitor the occupants. The GPS system uses orbiting satellites to communicate with the terrestrial transceiver to determine a location of the occupant in the area. However, such systems are generally less effective indoors or in other environments where satellite signals may be blocked, reducing accuracy of detecting the occupant in the area. There also have been proposals to detect occupants in an area based on effects on an RF signal received from a transmitter due to the presence of the occupant(s) in the area. These RF wireless communication systems generally detect an occupant in the area based on change in signal characteristics of a data packet transmitted over the wireless network. However, all the above methods require human effort and/or dedicated hardware (e.g. cameras, directional transmitters, etc.) that entail complexity and expense. Also, an inaccurate detection of the occupant in a region can occur by detecting an object, which does not move when multiple transmitters are transmitting the RF signals from multiple different regions of the area.

SUMMARY

Hence, there is a need for a system and method for automated occupancy detection that exploits properties of RF receivers in a RF wireless communication network to detect an occupant upon movement of the occupant in the area.

A system, for example, may include a radio frequency (RF) wireless communication network (network) including a plurality of nodes in an area. Each node includes a RF transceiver comprising a wireless communication transmitter and a wireless communication receiver. Each transmitter is configured to transmit RF spectrum signals at a plurality of times. Each receiver is configured to receive RF spectrum signals from a transmitter in each of one or more other nodes in the area, at the plurality of times, and is also configured to generate an indicator data of a signal characteristic of received RF spectrum signal propagated in the RF network at each of the plurality of times. The system also includes a computer coupled to the RF network having access to a parameter of a configuration of the network. When each time among the plurality of times is a current time, the computer is configured to, obtain the indicator data of the RF spectrum signal propagated in the network received via the wireless receiver of the RF transceiver, determine a modification in the indicator data at the current time from the indicator data at a preceding time among the plurality of times due to a movement of an occupant in the area; and detect an occupancy condition in the area based on the modification in the indicator data and the parameter.

An example of method involves accessing a parameter of a configuration of a radio frequency (RF) wireless communication network (network) in an area. The RF network includes a plurality of nodes. During each of a plurality of times, the method includes transmitting RF spectrum signals from the plurality of nodes of the RF network and obtaining indicator data of the RF spectrum signal propagated in the network, from a RF receiver in at least one of the plurality of nodes of the RF network. When each time among the plurality of times is a current time, the method further includes determining a modification in the indicator data at the current time from the indicator data at a preceding time among the plurality of times responsive to a movement of an occupant in the area; and detecting an occupancy condition in the area based on the modification in the indicator data and the parameter.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict implementations in accord with the present teachings, by way of example only, not by way of limitation. In the figures, like reference numerals refer to the same or similar elements.

FIG. 2A illustrates a system architecture of an occupancy detection system configured to function on a radio frequency (RF) wireless communication network.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

To provide improved occupancy detection in an area of a network, e.g. a radio frequency (RF) ad hoc wireless mesh network of a lighting system or the like, the present disclosure includes a system and method for exploiting properties of a configuration of the RF wireless network to detect an occupant in the area. Thus an occupancy is detected based on measurements of RF perturbations in an area or space and the properties.

Figure 1A:
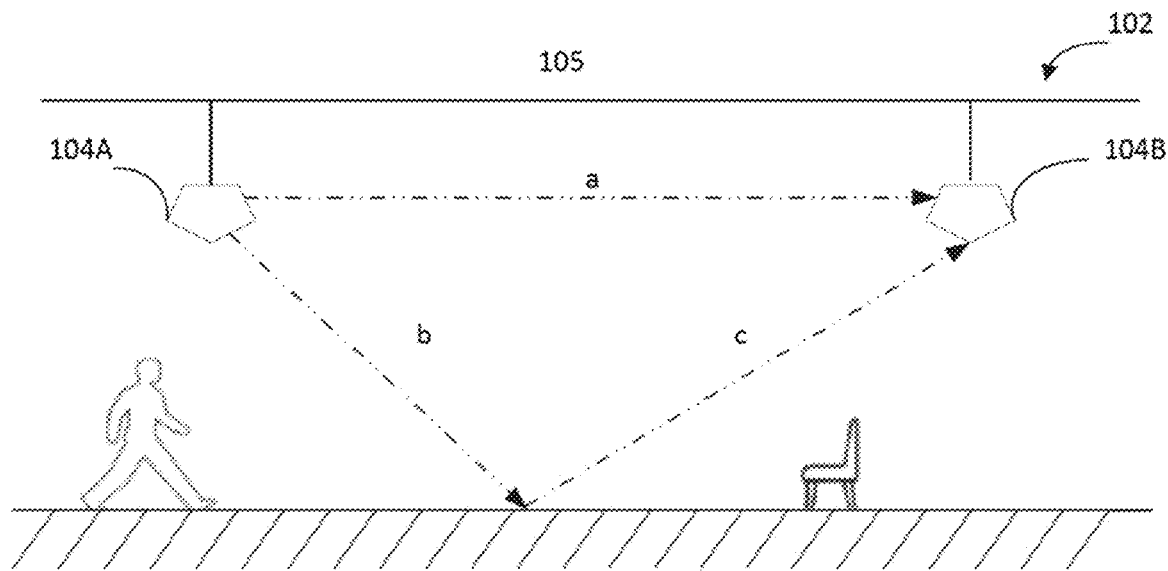
FIG. 1A illustrates an example of a multipath signal propagation in an area configured to function on a radio frequency (RF) wireless communication network.

Referring to FIG. 1A, there is illustrated an example of a multipath signal propagation in an area 105 configured to function on a radio frequency (RF) wireless communication network (network) 102. In wireless telecommunications, multipath is the propagation phenomenon that results in radio signals reaching the receiving antenna by two or more paths. The network 102 includes two systems antennas/RF nodes (nodes) 104a and 104b integrated within a luminaire mounted on a ceiling or wall of the area 105. In this example, node 104a includes a transmitter (not shown) configured to transmit RF spectrum (RF) signals and 104b includes a receiver (not shown) configured to receive RF spectrum (RF) signals. Although, two nodes are shown, it is known to one of ordinary skill in the art that the network 102 may include multiple nodes. Even though, node 104a only includes a transmitter, it is known to one of ordinary skill in the art that the node 104a may also include a receiver and as such function as a RF transceiver. Similarly, even though, node 104b only includes a receiver, it is known to one of ordinary skill in the art that the node 104b include a transmitter and as such also function as the RF transceiver.

As shown in FIG. 1A, some of the RF signal takes a straight path a directly to the node 104b, while some RF signal follows a first path b to the floor, bounces, and follows a second path c to the node 104b, where it combines by superposition with the signal that followed path a. These bounce paths depend complexly on the frequency of the signal and the geometry and composition of the local environment in the area 105. Although, only two paths of the RF signals are shown, it is known to one of ordinary skill in the art that the RF signal broadcasts in all directions. Also shown is in an occupant 105 in the area 100 who is not in the vicinity of the two nodes 104a and 104b. If an environment in the area 105 and transmitted RF signal do not change, the received RF signal does not change. However, any changes in the local environment, such as occupant movements, can alter the multipath propagation and so change one or more properties of the received RF signal as described in detail below.

Figure 1B:
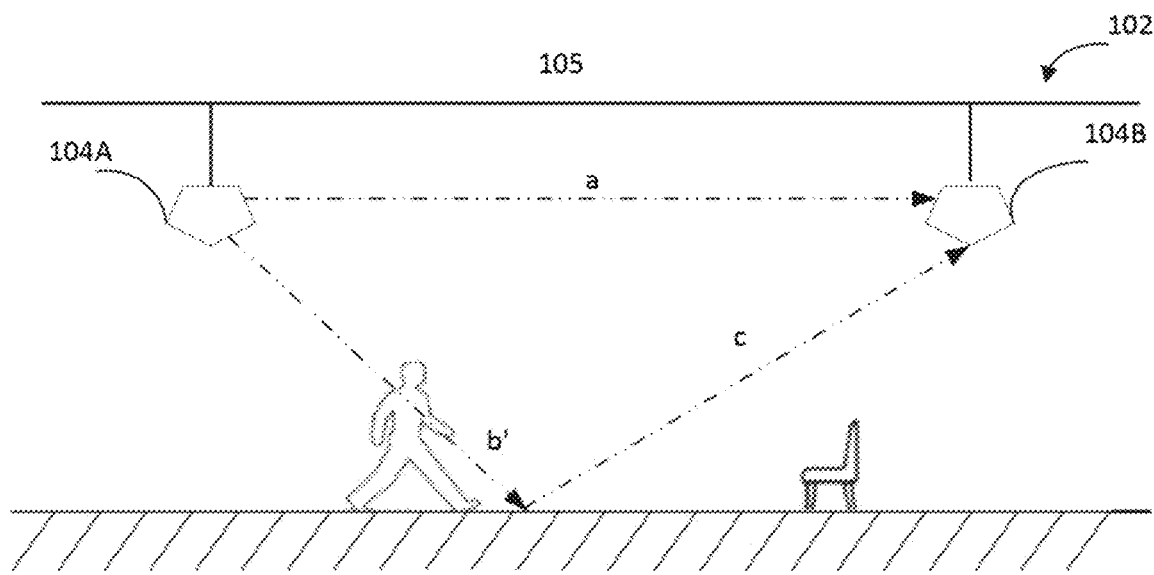
FIG. 1B illustrates an example of an effect of an occupancy in the multipath signal propagation in the area of FIG. 1A.

Referring to FIG. 1B, there is illustrated an example of an effect of occupancy in the multipath signal propagation in the area 100 of FIG. 1A. In one implementation, the occupancy alters the multipath signal propagation in the area 100. As shown, the occupant 105 has moved in the vicinity of the two nodes, 104a and 104b which does not change the path a but results in altering path b to path b'. The RF signal that travels path c is therefore not the same as before path b was modified, and the total RF signal measured by the second node 104b is changed. Accordingly, movement of the occupant 105 alters the multipath propagation, which results in modification of the received RF signal. In one implementation, a parameter of a configuration of the network 102 is utilized to detect the modification of the received RF signal. In one implementation, an occupant is detected based on the modified received RF signal and the parameter as described in greater details below with respect to FIGS. 2A and 2B.

Referring to FIG. 2A, there is illustrated a system architecture of an occupancy detection system 200 configured to function on a radio frequency (RF) wireless communication network (network) 202 in accordance with one implementation of the present disclosure. As illustrated, the occupancy detection system 200 detects for an occupant disposed within a physical space/area 205. In one implementation, the area 205 may include indoor environment such a room, a corridor, a hallway, a doorway or combinations of one or more of the indoor environments. In another implementation, the area 205 may include outdoor environments as well. The network 202 includes a plurality of system nodes (nodes) 204A-204E. The system node has an intelligence capability to transmit and receive data and process the data. In one example, the nodes 204A-204E are in the form of broadcast RF device as described in more detail with respect to FIGS. 9-11 below. An example of an RF device may be an electronic device used to transmit and/or receive radio signals between two other devices, such as the nodes 204A-204E. In another example, the nodes 204A-204E are in form of a Bluetooth low energy (BLE) equipped device as described in more detail with respect to FIGS. 10-11 below.

A BLE equipped device may be a wireless network technology designed to provide wireless communication with reduced power.

Figure 3:
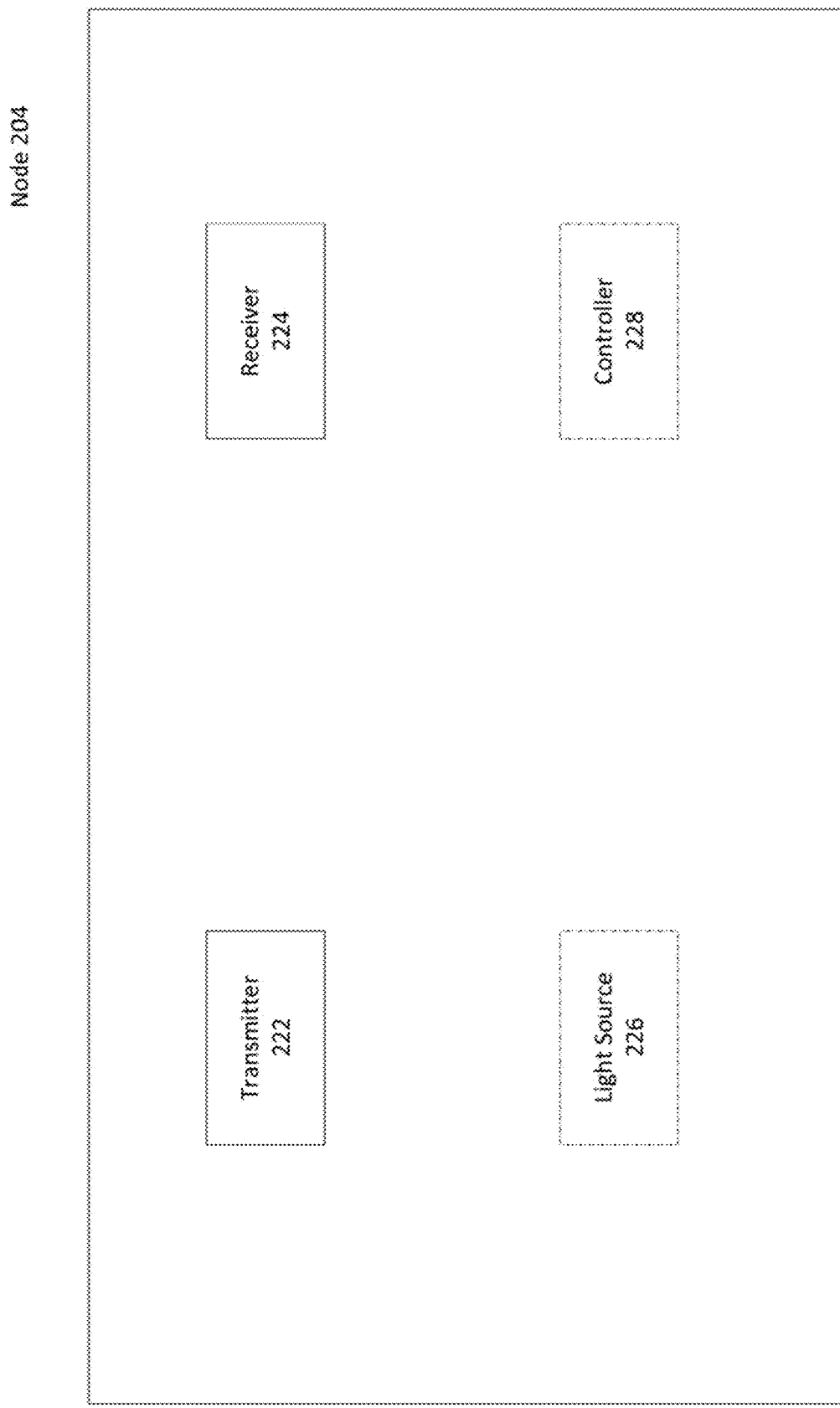
FIG. 3 illustrates an example of a radio frequency (RF) transceiver of a node in the RF wireless communication network of FIGS. 2A and 2B.

In one implementation, each of the nodes 204A-204E is a RF transceiver that includes a wireless radio transmitter (Tx) 220 and a wireless radio receiver (Rx) 224 (sometimes referenced together as a transceiver) as shown in FIG. 3. The Tx 220 is configured to transmit RF spectrum (RF) signals and the Rx 224 is configured to receive RF spectrum (RF) signals.

The RF spectrum or "radio spectrum" is a non-visible part of the electromagnetic spectrum, for example, from around 3 MHz up to approximately 3 THz, which may be used for a variety of communication applications, radar applications, or the like. In the discussions above, the RF transmitted and received for network communication, e.g. Wifi, BLE, Zigbee etc., was also used for occupancy detection functions, in the frequencies bands/bandwidths specified for those standard wireless RF spectrum data communication technologies. In another implementation, the RF transceiver is an ultra-wide band (also known as UWB, ultra-wide band and ultra-band) transceiver. UWB is a radio technology that can use a very low energy level for short-range, high-bandwidth communications over a large portion of the radio spectrum. UWB does not interfere with conventional narrowband and carrier wave transmission in the same frequency band. Ultra-wideband is a technology for transmitting information spread over a large bandwidth (>500 MHz) and under certain circumstances be able to share spectrum with other users.

Ultra-wideband characteristics are well-suited to short-distance applications, such as short-range indoor applications. High-data-rate UWB may enable wireless monitors, the efficient transfer of data from digital camcorders, wireless printing of digital pictures from a camera without the need for a personal computer and file transfers between cell-phone handsets and handheld devices such as portable media players. UWB may be used in a radar configuration (emitter and deflection detection at one node) for real-time location systems and occupancy sensing/counting systems; its precision capabilities and low power make it well-suited for radio-frequency-sensitive environments. Another feature of UWB is its short broadcast time. Ultra-wideband is also used in "see-through-the-wall" precision radar-imaging technology, precision detecting and counting occupants (between two radios), precision locating and tracking (using distance measurements between radios), and precision time-of-arrival-based localization approaches. It is efficient, with a spatial capacity of approximately $1013$ bit/s/m$^2$. In one example, the UWB is used as the active sensor component in an automatic target recognition application, designed to detect humans or objects in any environment.

At times, the node 204 may use its Tx 220 as part of an occupancy detection operation; and at other times the node may use its Rx 224 as part of an occupancy detection operation. Such nodes also typically include a processor, memory and programming (executable instructions in the form of software and/or firmware). Although the processor may be a separate circuitry (e.g. a microprocessor), in many cases, it is feasible to utilize the central processing unit (CPU) and associated memory of a micro-control unit (MCU) integrated together with a transceiver in the form of a system on a chip (SOC). Such an SOC can implement the wireless communication functions as well as the intelligence (e.g. including any detector or controller capabilities) of the system node.

Although, a single transmitter and a single receiver is shown, it is known to one of ordinary skill in the art that the node 204 may include multiple transmitters and/or multiple receivers. In an alternate implementation, the node 204 is a lighting element including a light source 226 and is configured as lighting device. The lighting element, for example, may take the form of a lamp, light fixture, or other luminaire that incorporates the light source, where the light source by itself contains no intelligence or communication capability, such as one or more LEDs or the like, or a lamp (e.g. "regular light bulbs") of any suitable type. The light source 226 is configured to illuminate the area 205. In one example, the light source 226 is configured to illuminate portions or regions of the area 205. Typically, a lighting system will include one or more other system nodes, such as a wall switch, a plug load controller, or a sensor.

In another alternate implementation, the system node 204 includes a controller 228. In one implementation the controller 228 may be the same or an additional processor configured to control operations of elements in the system node 204 in response to detection of the occupancy condition in the area 205. For example, in an alternate implementation, when the system node 204 is configured to be a lighting device and includes a light source 226, the controller 228 is configured to process a signal to control operation of the light source 226. In one alternate implementation, the controller 228 is configured to turn ON or OFF the light source 226 upon an occupancy condition detected by a computing device outside the network 202 (for example, a computer 210 of FIGS. 2A and 2B). In another implementation, the controller 228 communicates the occupancy condition to a lighting network (not shown) via a data packet. The data packet is received by one or more luminaries in the lighting network, which are configured to turn ON or OFF the light source 226 based on the occupancy condition respectively provided in the data packet. Accordingly, the occupancy detection system 200 communicates the occupancy condition with other networks. In an alternate implementation, a computing device/processor outside the network 202 (for example computer 210 of FIGS. 2A and 2B) controls operations of elements such as the light source 226 upon the occupancy detection.

At a high level, the Tx 220 in one of the nodes 204a-204e transmits a RF spectrum (RF) signal at a plurality of times. In one implementation, each of the plurality of times is real time. The transmission may be specifically for the occupancy detection. In some cases, however, there the transmitter is another lighting device or other lighting system element (e.g. a sensor or a wall switch), the transmissions may be regular lighting related communications, such as reporting status, sending commands, reporting sensed events, etc. An Rx 224 in another one of the nodes 204A-204E receives the transmissions of the RF signal during each of the plurality of times. The Rx 224 generates an indicator data of one or more characteristics of the received RF signal at each of the plurality of times. In one implementation, each of the plurality of times includes a window of time such that the indicator data is generated for each window of times. Each of a current window of time overlaps with a preceding window of time and the following window of time. Some of examples of the characteristics of the received RF signal include but are not limited to received signal strength indicator (RSSI) data, bit error rate, packet error rate, phase change etc. or a combination of two or more thereof. The RSSI data represents measurements of signal strength of the received RF. The bit error rate is rate of incorrect bits in received RF signals versus total number of bits in the transmitted RF signals. The packet error rate is rate of incorrect packets in received RF signals versus total number of packets the transmitted RF signals. Phase change is a change of phase of a received RF signal compared to previous reception of the RF signal (typically measured between the antennas spaced apart from each other). For the purpose of the present description, we use RSSI data as the characteristics of the RF signal for processing by the node 104b to generate as the indicator data. The Rx 224 measures the signal strength of the received RF signal and generates the RSSI data based on the signal strength. The signal strength of each of the RF signal is based on whether an occupant exists in a path between the nodes 204A-204E in the area 205 as described below.

Figure 2B:
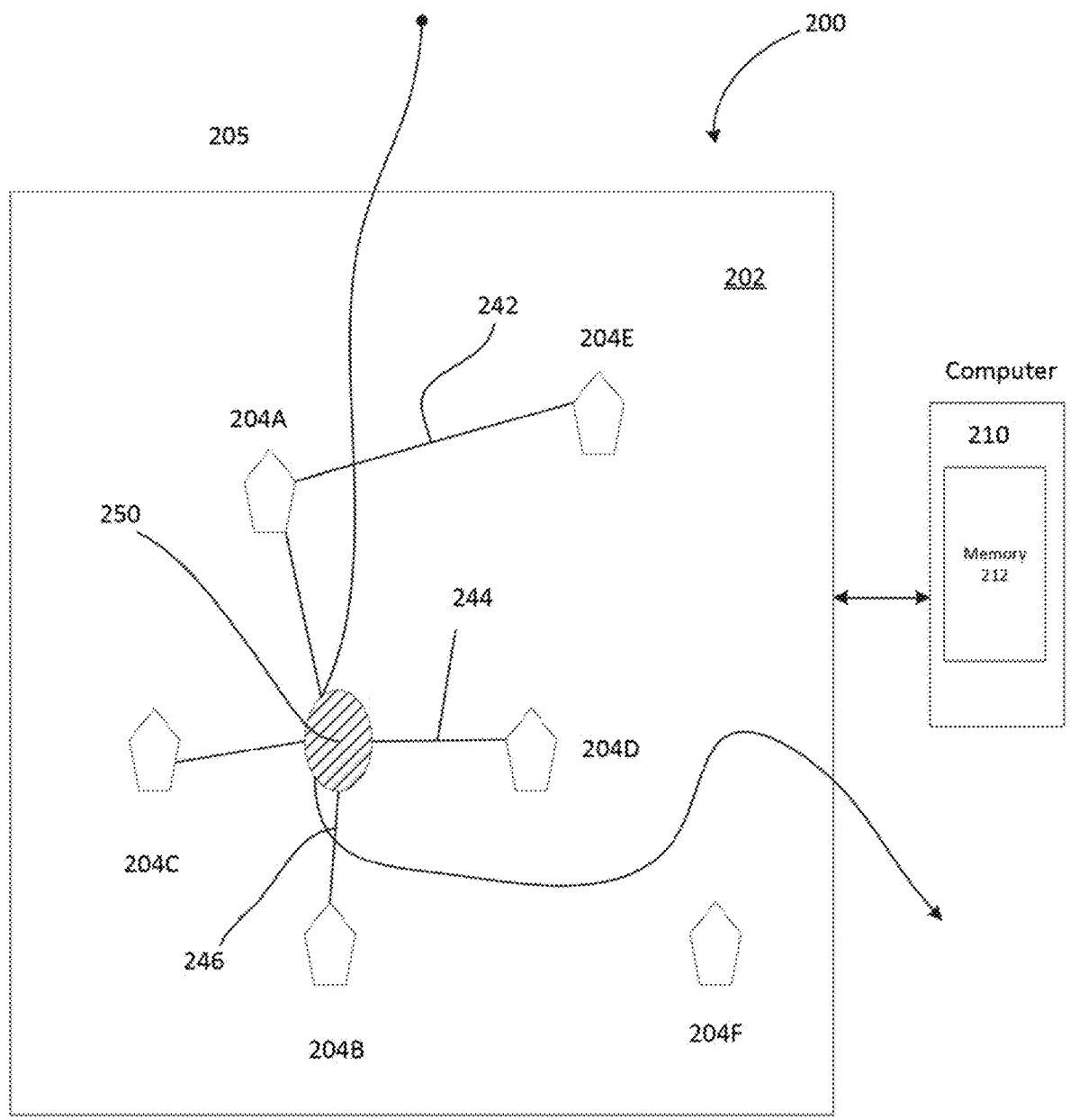
FIG. 2B illustrates an operation example of the system architecture of the occupancy detection system of FIG. 2A.

FIG. 2B illustrates an operational example of the system architecture of the system 200 of FIG. 2A. A route 230 of an occupant 250 movement is shown in FIG. 2B. Also, shown is a signal path between a pair of nodes. For example, a signal path 242 of transmitted and received RF signals between node pairs, 204E and node A, a signal path 244 of transmitted and received RF signals between node pairs, 204C and 204D and a signal path 246 of transmitted and received RF signals between node pairs 204A and the 204B. Although, a single signal path shown in FIG. 2B illustrates coverage of just a portion of the area 105 between each of the pair of nodes, it is known to one of ordinary skill in the art that there are many signal paths that may occur between each of the pair of nodes which cover a larger area near and between each of the pair of nodes. As the occupant 250 follows the route 230, RF signal propagation is modified at a time among multiple times between each of the node pairs, 204E and 204A, 204C and 204D; and 204A and 204B respectively.

The system 200 as illustrated in FIGS. 2A and 2B also includes a computer 210 coupled to network 202. In one implementation, the computer 210 is directly coupled with the network 202. In another implantation the computer 210 is coupled with the network 202 via a data communications network (such as the public Internet, a proprietary local area network, or the like). In one implementation, the network 202 includes one or more configuration parameters (parameters) to set up the network 202. The parameter relates to an aspect of including, but not limited to spatial diversity, frequency diversity, directional diversity, polarization diversity or a combinations of two or more as described in greater detail below. In one implementation, the computer 210 is a computing device configured to have access to the parameter of the network 202. In one implementation, the computer 210 includes a memory 212, which stores the parameter. In one implementation, the computer 210 at each of the current time among the plurality of times obtains the RSSI data of the RF signal propagation, determines a modification in the RSSI data at the current time from the RSSI data at a preceding time (prior to the current time) among the plurality of times based upon a movement of the occupant 250 in the area 205. As discussed above, the modification of the RF signal propagation results in modified RSSI data at the current time. As discussed above, in one implementation, each of the plurality of times includes a window of time such that the indicator data is generated for each window of times. Each of a current window of time overlaps with a preceding window of time and the following window of time. In one implementation, the computer 210 determines an occupant in the area based on the modified RSSI data and the parameter as discussed below.

In one implementation, the parameter relates to an aspect of the spatial diversity. The spatial diversity is a wireless diversity scheme that uses two or more antennas to improve quality and reliability of the wireless, e.g. RF signal. The spatial diversity includes a diversity in a distance between the sending/transmitting antenna, Tx and the receiving antenna Rx at a node among the nodes 204A-204F in the network 202. In one implementation, the distance is a non-multiple of a half wavelength ($\lambda/2$) of the transmitted RF signal from the transmitter, Tx of one node among the nodes 204A-204F in the network 202. In one example, the distance is quarter of wavelength ($\lambda/4$) of the transmitted RF signal. In one example, the transmitted RF signal is a BLE signals and $\lambda$ is on the order of centimeters. In one implementation, the network 202 is configured to utilize the spatial diversity in order to detect an occupancy condition in the area 105 as described below.

In one implementation, the distance between the Rx in the node 204A is non-multiple of the half wavelength ($\lambda/2$) of the transmitted RF signal from the Tx e.g. from the node 204E. In one example, the distance is a quarter of wavelength ($\lambda/4$). As such, this distance ensures that when the occupant 250 moves in the area 205 and comes in the signal path 242, the Rx in the node 204A is able to detect the change in the RF signal. The change in the RF signal results in change in the RSSI data. Accordingly, the distance between the Rx and the Tx may affect the RSSI data.

In one implementation, the node 204A includes two Rx. Each of the two Rx is spaced by the non-multiple of the half a wavelength, for example, quarter of wavelength ($\lambda/4$) from the Tx in the node 204E. In one example, when the occupant 250 moves in the area 205 and comes in the signal path 242, each of the two Rx in the node 204A is able to detect the change in the RF signal, thus providing a confirmation of detection of the occupant 250 in the area 205. In another example, when the occupant 250 moves in the area 205 and comes in the signal path 242, one of the two Rx in the node 204A does not detect the change in the RF signal, however the other of the two Rx in the node 204A detects the change in the RF signal. Accordingly, the use of two or more Rx at individual nodes 204A-204F further ensures spatial diverse information about occupant caused changes in the RF signal propagation. As discussed above, for BLE signals, $\lambda$ is on the order of centimeters.

In one implementation, the parameter relates to an aspect of the frequency diversity. Frequency diversity includes diversity in multiple different frequencies of transmitted and received RF signals. In one example, the RF signal is a BLE signal, which reserves three frequencies for transmitting advertising packets (regularly broadcast by all nodes), which provides an opportunity for frequency diversity in BLE-based occupancy detection. In one implementation, the computer 210 applies the frequency diversity to the network 202 to detect an occupancy condition in the area 205 as described below.

In one implementation, each of the nodes 204A-204E transmits and receives signals at multiple frequencies. Each frequency responds differently to changes in the RF signal propagation due to occupancy movements in the area 205. Thus, the RF signal detected at one frequency is different from the RF signal detected at another different frequency, which results in change in the RSSI data. In one example, node 204A includes a Tx, node 204C includes a Rx and node 204D also includes the Rx. The Rx at node 204C receives a RF signal from the Tx in the node 204A at a first frequency which is different from the RF signal received at a second frequency of the by the Rx in the node 204D from the Tx in the node 204A resulting in change in the RF signal. In one implementation, the change in RF signal is detected by the Rx in node 204D at the second frequency. In another implementation, the change in RF signal is detected by the Rx in node 204C at the first frequency. In a further implementation, the change in RF signal is detected by both the Rx in the node 204C at the first frequency and by the Rx in the node 204D at the second frequency. Thus, the frequency diversity causes one or both of the Rx to detect the change in the RF signal. Accordingly, the use of multiple frequencies provides for frequency diverse information about changes in the RF signal propagation caused upon movement by the occupant 250 in the area 205.

Figure 4A:
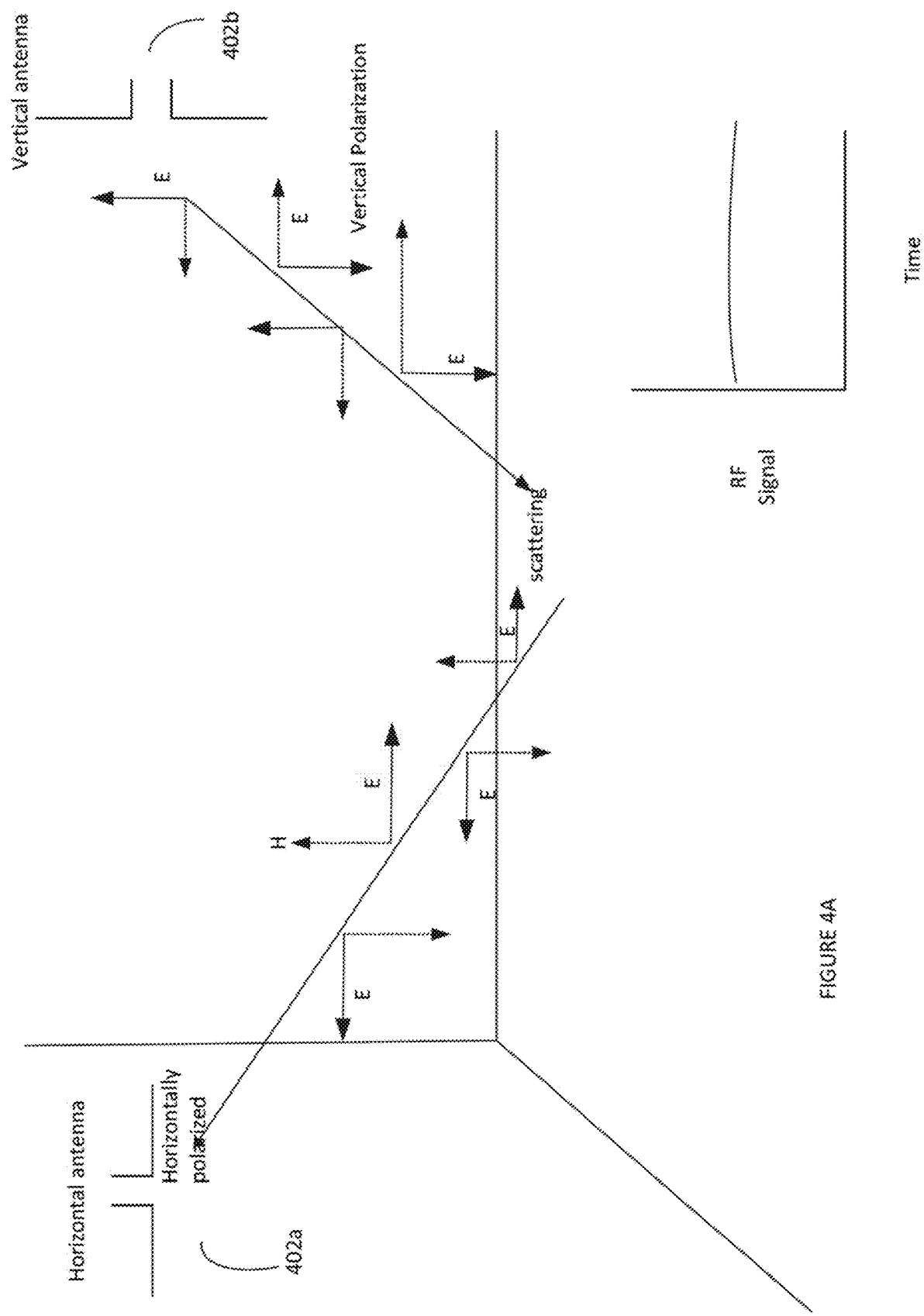
FIG. 4A is an example of a polarization diversity as a parameter of a configuration of the RF wireless communication network of FIG. 2A.
Figure 4B:
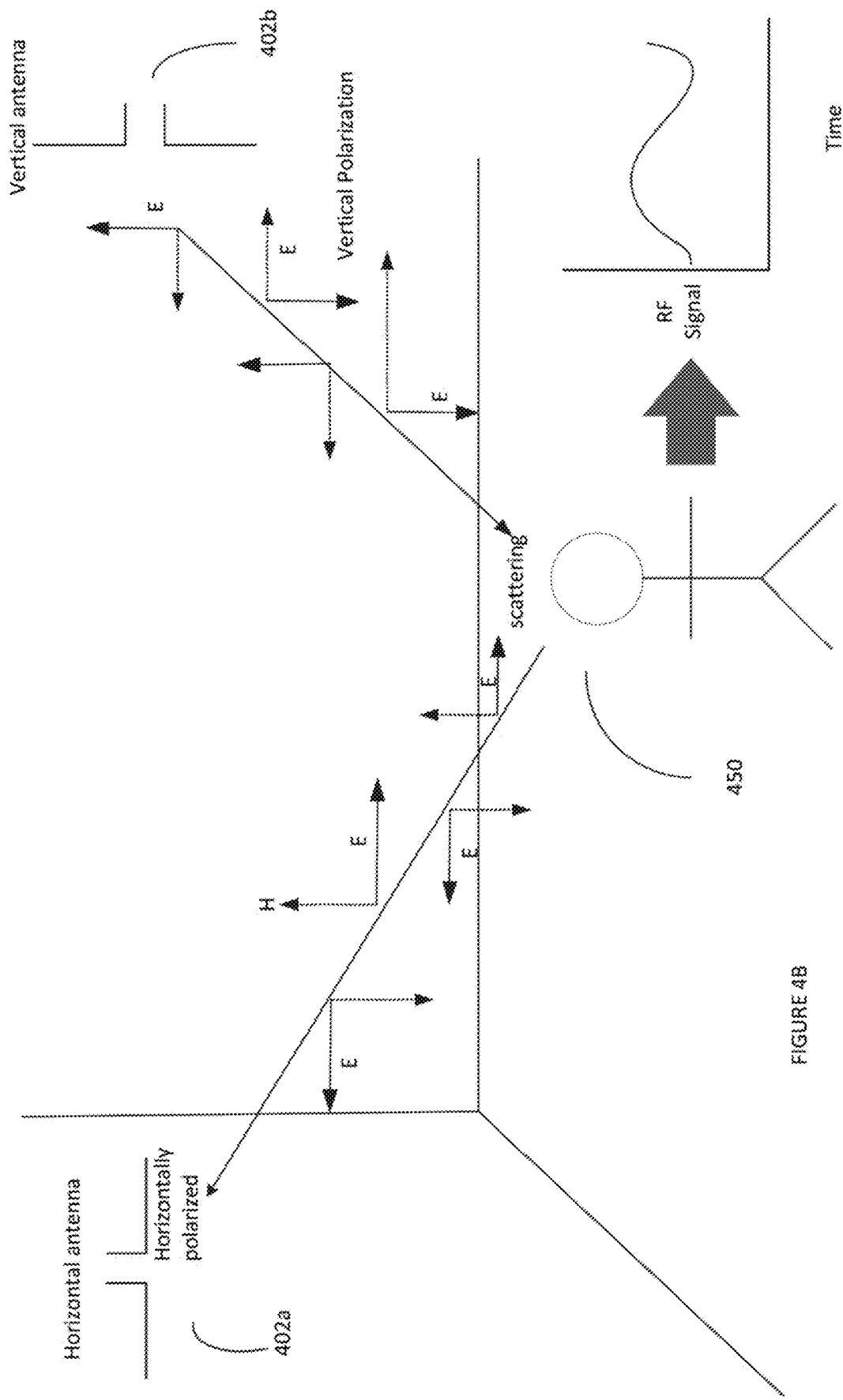
FIG. 4B shows is an example of a polarization diversity as a parameter of a configuration of the RF wireless communication network of FIG. 2B.

In one implementation, the parameter relates to an aspect of the polarization diversity. Polarization diversity includes diversity in orientation/polarization of the transmitted RF signal by the Tx in one or more of the nodes 204A-204E. Referring to FIGS. 4A and 4B, there is illustrated an example of a polarization diversity to be applied to a RF transmitter in two antennas. In one example, as shown in FIGS. 4A and 4B, there are shown two antennas, a horizontally polarized antenna 402a that can detect a horizontally polarized signal and a vertically polarized antenna 402b that can detect a vertically polarized signal. FIG. 4A shows an example of an approximately stable polarized RF signal since there is no movement on the ground that would cause any change in polarization. However, when the electric field hits a moving object such as an occupant 450 as shown in FIG. 4B, the RF signal scatters as a vertically polarized signal, thus a change in the polarization. This vertically polarized RF signal is detected by the vertical antenna 402b. In one implementation, the computer 210 applies the polarization diversity to the network 202 of FIG. 2B to detect an occupancy condition in the area 205 as described below.

In one implementation, a Tx in one or more of the nodes 204A-204E is set to a polarization. Similarly, an Rx in a different one or more of the nodes 204A-204E is also set to a polarization, which is different from the polarization of the Tx. An ideal, horizontally polarized Rx will not detect a vertically polarized signal, and likewise for a vertically polarized Rx will not detect a horizontally polarized signal. Since polarization can be modified by the signal propagation environment, a vertically polarized transmission, for example, may arrive as a signal of complex polarization that will be partly detectable even by a horizontally polarized Rx. So, upon a movement of the occupant 250 along one or more of the signal paths 242, 244 and 246 will result in change in polarization of the transmitted RF signal by the Tx, thus the transmitted RF signal will be received in a changed polarized RF signal by the Rx. The change in the polarized RF signal is detected as a change in RF signal propagation by the Rx. Thus the change in RF signal propagation results in change in the RSSI signal measured by the Rx to detect an existence of the occupant 250 along one or more of the signal paths 242, 244 and 246. In one implementation, such detection is made based on a receipt of the RF signal by the Rx shared (e.g. via switch) by two or more antennas with different polarizations. In this example, each of the two antennas are separate antennas such that one antenna may have horizontal polarization and another may have vertical polarization such that when the RF signal is received by the Rx, one antenna among the two antennas receives the RF signal depending on the polarization of the RF signal received by the Rx. In this implementation, any change in the polarization of the transmitted RF signal by the Tx at a current time in real time or detected based on the change in polarization compared with a prior time in the real time is determined to result in change in the RF signal propagation. Thus, the use of different polarizations of the transmitted RF signal by the Tx provides for polarized diverse information about changes in the RF signal propagation caused upon a movement by the occupant 250 in the area 205.

In one implementation, the parameter relates to an aspect of the directional diversity. Directional diversity includes diversity in directionality of the antenna in one or more of the nodes 204A-204E. Directional diversity also includes diversity in angle of arrival (AOA) detection of the RF signal received by the multiple Rx in the one or more nodes 204A-204E. In one example, the one or more nodes 204A-204E is a BLE node. In one implementation, the computer 210 applies the directional diversity to the network 202 to detect an occupancy condition in the area 105 as described below.

Figure 5:
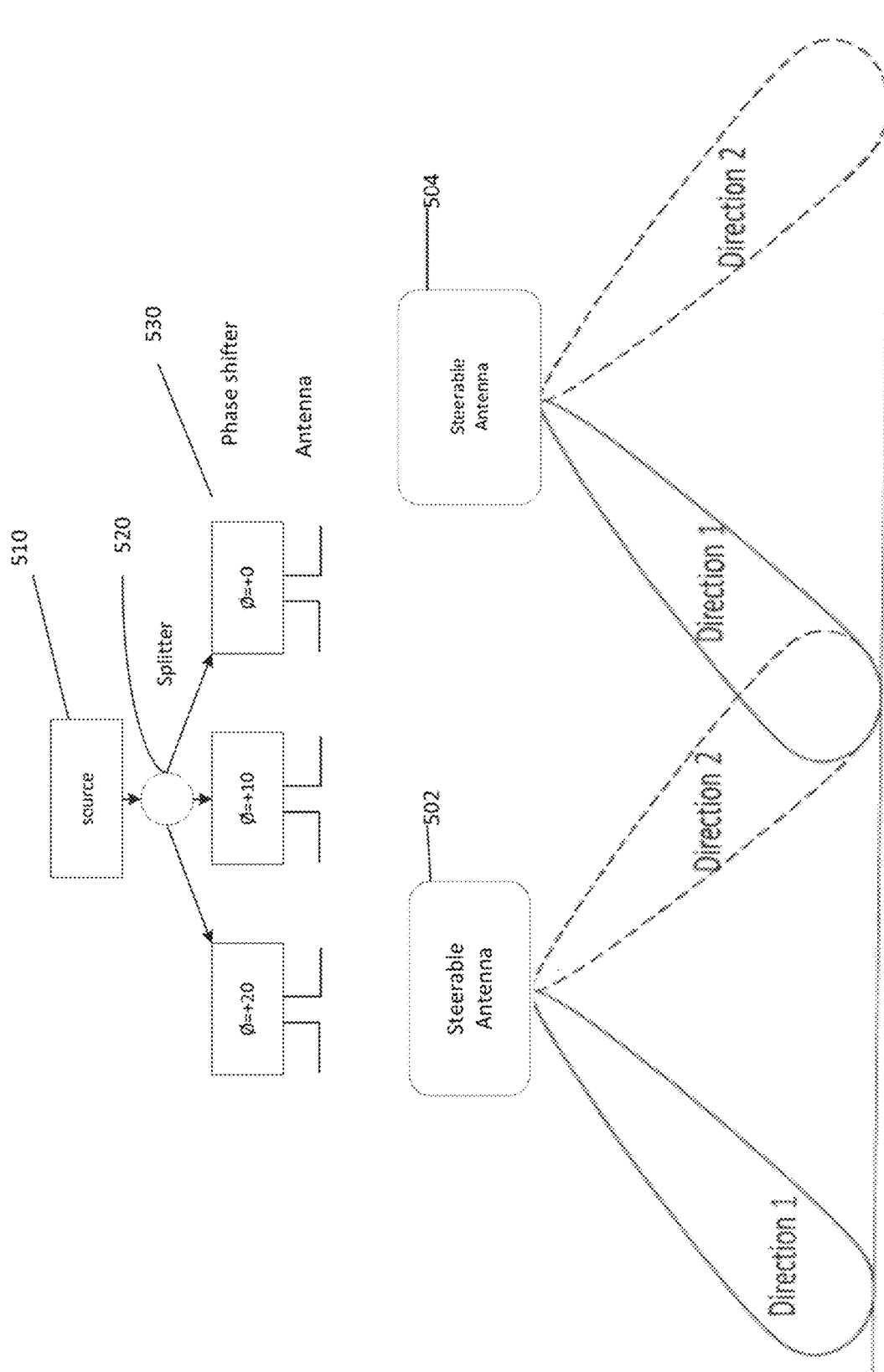
FIG. 5 is an example of a directional diversity as a parameter of a configuration of the RF wireless communication network of FIGS. 2A and 2B.

In one implementation, directionality of the Tx in the nodes 204A-204E reduces or eliminates multipath signal propagation, thus simplifying the relationship of RSSI data to occupancy detection. The received RF signal of perfectly straight-line RF signal (transmitted by the Tx placed in a node in a straight line direction), for example path a in FIG. 1 between two nodes 104a-104b in FIG. 1 is diminished by a directly intervening occupant. Accordingly, the Tx is switched in other directions in the node to detect an intervening occupant. In one implementation, the Tx in the one or more nodes 204A-204E is switched in multiple various directions of probability of an occupant movement in the area to detect the RF signals in each of these multiple various directions and transmit the RF signals. Accordingly, the switching or changing the Tx in multiple different directions allows to detect the RF signals from many of these multiple different directions. So, a change in the RF signal (caused by movement of the occupant 250 along one or more of the signal paths 242, 244 or 246 in the area 205) results in switching or changing of the Tx in the direction towards the occupant such that the changed direction of the transmitted RF signal is detected by the Rx. The Rx detects the changed direction of the transmitted RF signal as the change in RF signal. As discussed above, the change in the RF signal results in change in the RSSI data. Thus, the use of changing multiple different directions of the Tx provides for directional diverse information about changes in the RF signal propagation caused by an occupant's movement in the area 205. In one implementation, the direction of the Tx in the one or more nodes 204A-204E is fixed prior to real time. In one implementation, the direction of the Tx is changed at the real time. In one example, the direction of the transmitted RF signals are switched by switching between two or more antennas in different directions. In this example, the two antennas in different directions are separate antennas, which share same Rx (e.g. via a switch), such that when the RF signal is received by the Rx, one antenna among the two antennas receives the RF signal depending on the direction of the RF signal received by the Rx. In another example, the direction of the transmitted RF signals are switched between the two antennas based on the direction of the transmitted RF signals. In one example, the antennas are electrically steerable antennas. FIG. 5 shows an example of switching between the two antennas using beam steering phased array As shown, are steerable antennas 502 and 504 each of which transmits and receives RF signals in different directions, such as direction 1 and direction 2. Also, shown is a source 510 that transmits the RF signal to a splitter 520, which splits the RF signal and sends the split RF signal to a phase shifter 530, which controls the phase shift of the RF signal. Details of the example of phase shift applying the directional diversity applied to the RF transceiver in the RF wireless communication network of FIG. 2B is provided below.

In another implementation, the computer 210 utilizes the AOA to exploit the fact that a node equipped with an array of two or more antennas, an incoming transmitted RF signal typically arrives at each antenna at a slightly different time. For example, if one or more nodes 204A-204E is aligned with a pair of antennas, the RF signal will arrive first at the nearer member of the antenna pair and then at the other member of the antenna pair further way. Such time shifts or differences between RF signals are termed "phase" differences, which is another source of directionally diversity. Such changes in phase measurements across an array reveal modifications of local RF signal propagation by movement of the occupant 250 in one or more signal paths 242, 244 or 246 in the area 205. Referring back to the example, above, if the RF signal arrives at the member of the antenna pair that is further away before the RF signal arrives at the nearer member, there would be a shift in phase array. Accordingly, the computer 210 measures the phase arrays over time and processes the phase measurements to determine a phase shift in order to detect an occupant 250 or estimate number of occupants in the area 105. Such processing may include but not limited to, classical statistical approaches (e.g., calculation of sliding averages, variances, and correlation coefficients), various probability model-fitting or machine-learning methods (Bayesian networks, neural networks, etc.) or combinations of these methods.

In one implementation, other related information of the occupant such as an approximate of number of occupants, an estimate of type of the movement of the occupant and an estimate of size of the occupant are determined based on the detection of the occupant 250 in the area 105. In one example, an estimate of number of occupants is based on amount of modification of the RF signals. The amount of modification of the RF signals may be a pre-determined range value. For example, if there is a less fluctuation in the RF signals number of occupants is estimated to be 1-3 occupants, for a medium fluctuation in the RF signals, number of occupants is estimated to be 3-6 occupants, for a significant fluctuation in the RF signals, number of occupants is estimated to be 6-10 occupants. In another example, an estimate of type of movement of the occupant is based on speed of fluctuation in the RF signals. The speed of the fluctuation in the RF signals may be a pre-determined range value. For example, if the RF signals fluctuate very quickly, then it is estimated that the occupant is moving at a fast speed, if the RF signals fluctuate at a medium rate, the occupant is moving at a medium speed, if the RF signals fluctuate slowly, then it is estimated that the occupant is moving at a slow speed. In a further example, an estimate of the size of the occupant is determined based on amount of reflection of the RF signals received at the node. The amount of reflection of the RF signals may be a pre-determined range value. For example, if a moving object is a heavy metal, the amount of RF signals reflected from the heavy metal would very high, thus resulting in a very high RF signal strength as opposed to a lower RF signal strength based on the signals reflected from a movement of the human.

Figure 6:
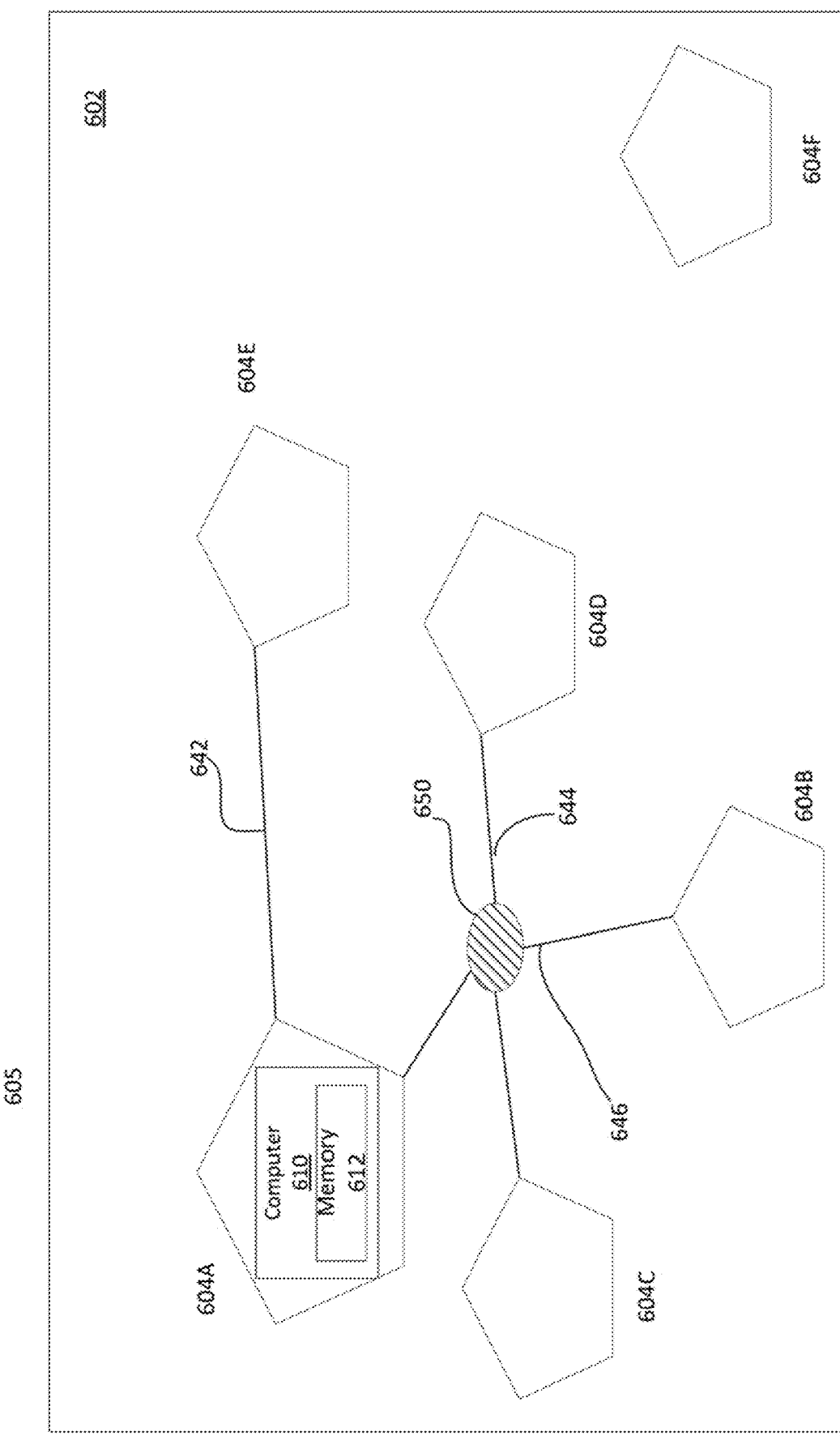
FIG. 6 illustrates another example of the system architecture of the occupancy detection system to function on a radio frequency (RF) wireless communication network.

Referring to FIG. 6, there is illustrated a system architecture of a radio frequency (RF) wireless communication system network (network system) 602 in accordance with one implementation of the present disclosure. As illustrated, the network system 602 detects for an occupant disposed within a physical space/area 605. In one implementation, the area 605 is similar to the area 205 of FIGS. 2A and 2B as discussed above. The network system 602 includes a plurality of system nodes (nodes) 604A-604E. The system nodes (nodes) 604A-604E are similar to the system nodes 204A-204E of FIGS. 2A and 2B with the exception of including a computer 610 in one or more of the nodes 604A-604E. The system node has an intelligence capability to transmit and receive data and process the data. In one example, the nodes 604A-604E are in the form of broadcast RF device as described in more detail with respect to FIGS. 9-11 below. An example of an RF device may be an electronic device used to transmit and/or receive radio signals between two other devices, such as the nodes 604A-604E. In another example, the nodes 604A-604E are in form of a Bluetooth low energy (BLE) equipped device as described in more detail with respect to FIGS. 10-11 below. A BLE equipped device may be a wireless network technology designed to provide wireless communication with reduced power. Also, shown in FIG. 6 are signal paths 642, 644 and 646 similar to the signal paths 242, 244 and 246 respectively as discussed above with respect to FIG. 2B. An occupant 650 illustrated in FIG. 6 may be similar to the occupant 250 of FIG. 2B.

Figure 7:
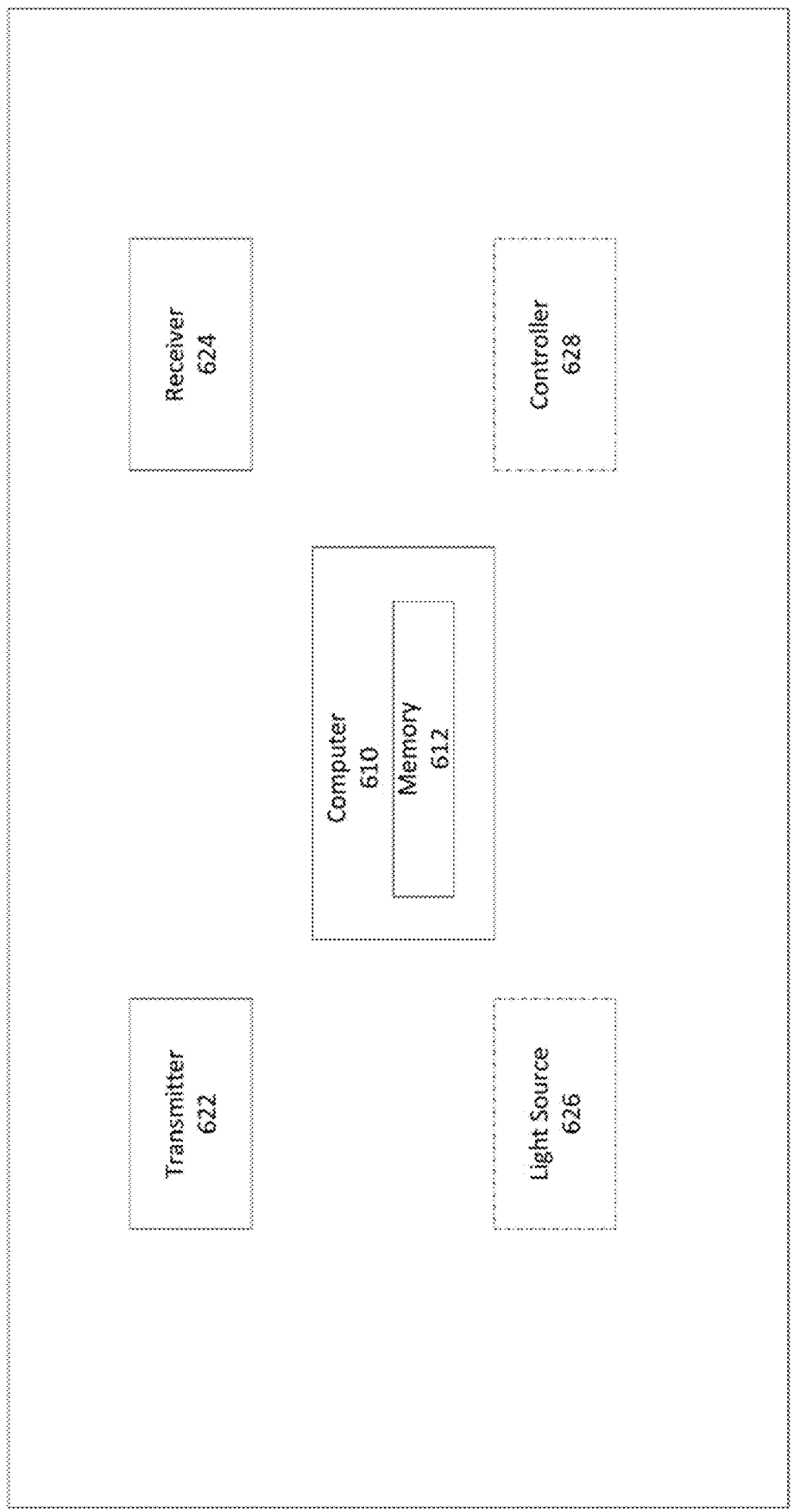
FIG. 7 illustrates an example of a node in the RF wireless communication network of FIG. 6.

In one implementation, each of the nodes 604A-604E is a RF transceiver that includes a wireless radio transmitter (Tx) 620 (similar to Tx 220 of FIG. 3) and a wireless radio receiver (Rx) 624 (similar to Rx 224 of FIG. 3) as shown in FIG. 7. Although, each of nodes 604A-604E includes Tx and Rx, FIG. 7 illustrates an example of the node 604A. The Tx 620 is configured to transmit RF spectrum (RF) signals and the Rx 624 is configured to receive RF spectrum (RF) signals.

As discussed above, the RF spectrum or "radio spectrum" is a non-visible part of the electromagnetic spectrum, for example, from around 3 MHz up to approximately 3 THz, which may be used for a variety of communication applications, radar applications, or the like. In the discussions above, the RF transmitted and received for network communication, e.g. Wifi, BLE, Zigbee etc., was also used for occupancy detection functions, in the frequencies bands/bandwidths specified for those standard wireless RF spectrum data communication technologies. In another implementation, the RF transceiver is an ultra-wide band (also known as UWB, ultra-wide band and ultraband) transceiver. UWB is a radio technology that can use a very low energy level for short-range, high-bandwidth communications over a large portion of the radio spectrum. UWB does not interfere with conventional narrowband and carrier wave transmission in the same frequency band. Ultra-wideband is a technology for transmitting information spread over a large bandwidth (>500 MHz) and under certain circumstances be able to share spectrum with other users.

Although, a single transmitter and a single receiver is shown, it is known to one of ordinary skill in the art that the node 604 may include multiple transmitters and/or multiple receivers. In an alternate implementation, the node 604 is a lighting element including a light source 626 and is configured as lighting device. The light source 626 is similar to the light source 226 of FIG. 3 as discussed above. In another alternate implementation, the system node 604 includes a controller 628. The controller 628 is similar as the controller 228 of FIG. 3. In one alternate implementation, the controller 628 is configured to turn ON or OFF the light source 626 upon an occupancy condition detected by the computer 610 inside the network system 602. In another alternate implementation, a computing device/processor inside the network system 602 (for example computer 610 of FIG. 7) controls operations of elements such as the light source 626 upon the occupancy detection.

In one implementation, the network system 602 includes one or more configuration parameters (parameters) to set up the network system 602. The parameters are same as the parameter discussed above such that the parameter relates to an aspect of including, but not limited to spatial diversity, frequency diversity, directional diversity, polarization diversity or a combinations of two or more as described in greater detail below. In one implementation, the computer 610 functions similar to the computer 210 of FIG. 3 such that the computer 610 is a computing device configured to have access to the parameter of the network system 602. In one implementation, the computer 610 includes a memory 612 (similar to the memory 312 of FIG. 3), which stores the parameter. In one implementation, the computer 610 at each of the current time among the plurality of times obtains the RSSI data of the RF signal propagation, determines a modification in the RSSI data at the current time from the RSSI data at a preceding time (prior to the current time) among the plurality of times based upon a movement of the occupant 650 in the area 605. As discussed above, the modification of the RF signal propagation results in modified RSSI data at the current time. As discussed above, in one implementation, each of the plurality of times includes a window of time such that the indicator data is generated for each window of times. Each of a current window of time overlaps with a preceding window of time and the following window of time. In one implementation, the computer 610 determines an occupant in the area based on the modified RSSI data and the parameter as discussed in detail above.

Figure 8:
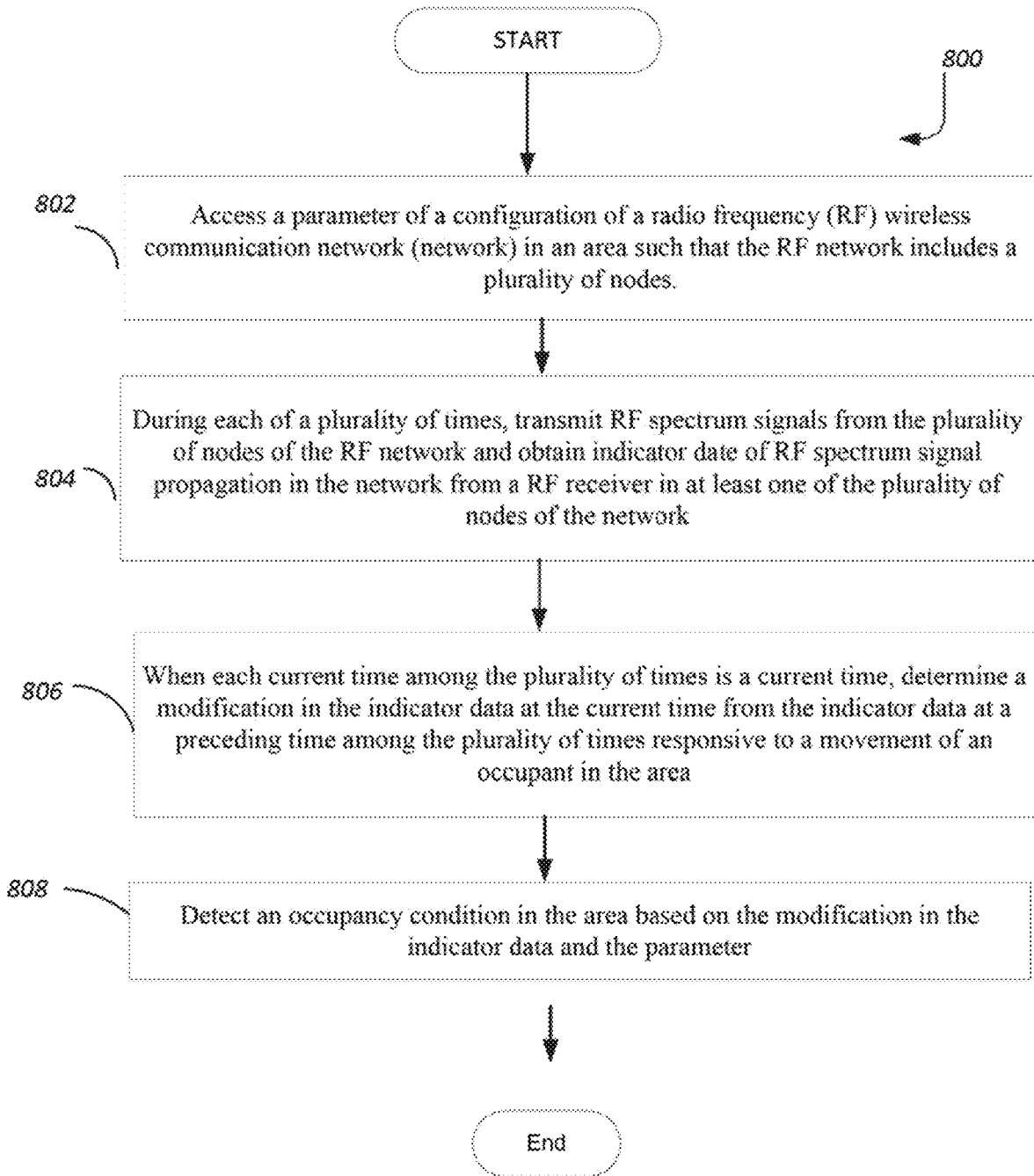
FIG. 8 is a flowchart of an example of a process for detecting an occupant in the RF wireless communication network.

FIG. 8 is a flowchart of an example of a method 800 for occupancy detection in a RF wireless communication network. In one implementation, the method 800 is implemented by the computer 210 of FIGS. 2A and 2B. In another implementation, the method 800 is implemented by the computer 610 of FIGS. 6 and 7.

At block 802, access a parameter of a configuration of a radio frequency (RF) wireless communication network (network) in an area such that the RF network includes a plurality of nodes. As discussed above, aspect of the parameter relates to one or more aspects including but not limited to spatial diversity, frequency diversity, directional diversity and polarization diversity. At block 804 during each of a plurality of times, transmit RF spectrum signals from the plurality of nodes of the RF network and obtaining indicator date of RF spectrum signal propagation in the network from a RF receiver in at least one of the plurality of nodes of the network. As discussed above indicator data includes one or more characteristics of the received RF signal at the plurality of times. Some of examples of the characteristics include but are not limited to received signal strength indicator (RSSI) data, bit error rate, packet error rate, phase change etc. or a combination of two or more thereof.

At block 806, when each current time among the plurality of times is a current time, determine a modification in the indicator data at the current time from the indicator data at a preceding time among the plurality of times responsive to a movement of an occupant in the area. As discussed above, the modification in the indicator data is detected upon change in the RF spectrum signal propagated in the network due to occupant's movement in the area. Also, as discussed above, in one implementation, each time among the plurality of times is a window of time among a plurality of windows of times such that the current time is a current window of time among the plurality of windows, preceding time is preceding window of time among the plurality of windows of times and a following time among the plurality of times is a following window of time among the plurality of times.

Further, each of the current window of time overlaps with the preceding window of time and the following window of time. At block 808 detect an occupancy condition in the area based on the modification in the indicator data and the parameter. In one implementation, one or more nodes include a light source and the light source is controlled upon detection of the occupancy condition as discussed above.

Figure 9:
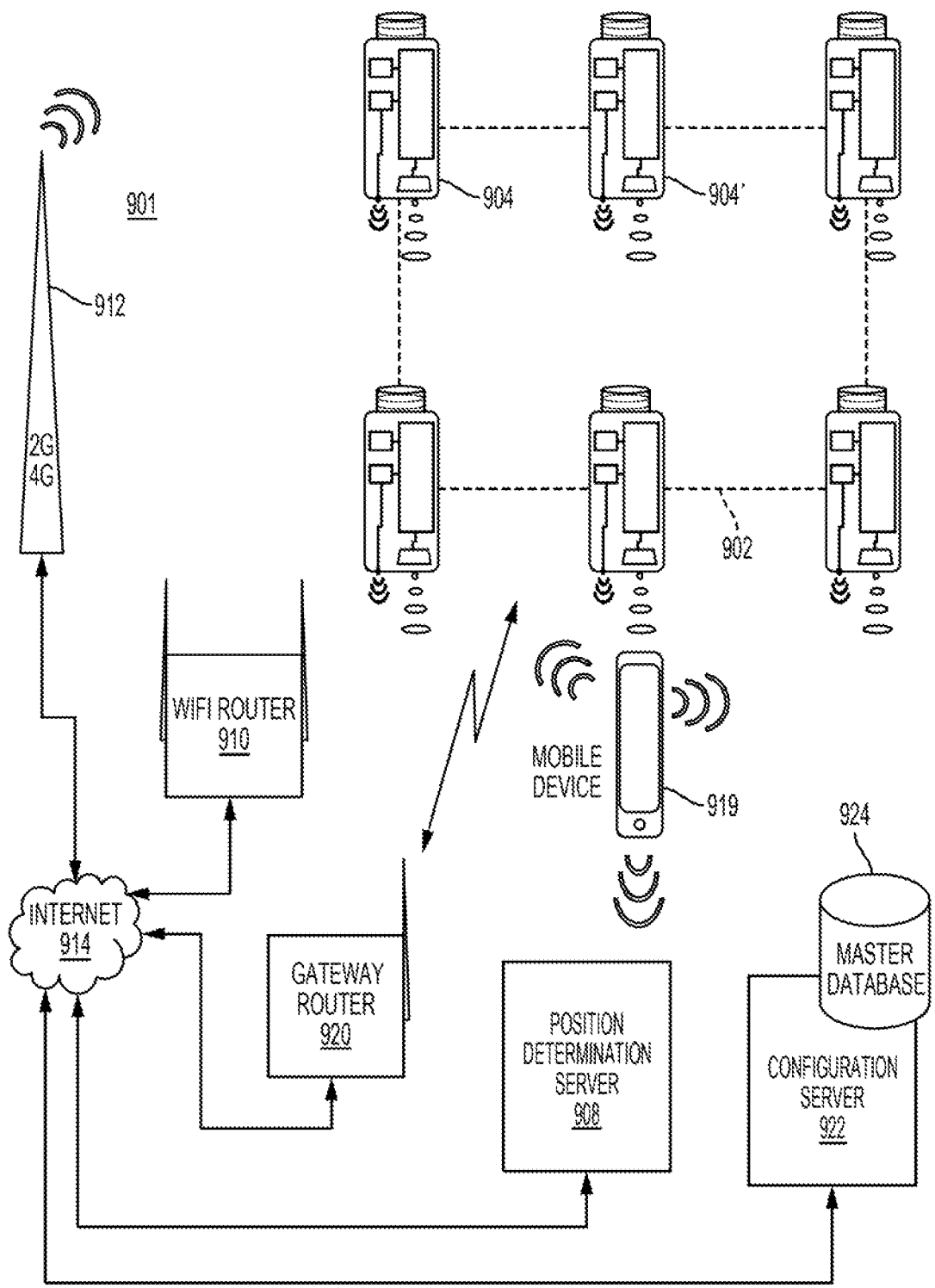
FIG. 9 depicts a system of lighting devices and network connected resources, wherein the lighting device are arranged in an ad hoc wireless mesh-type network.
Figure 10:
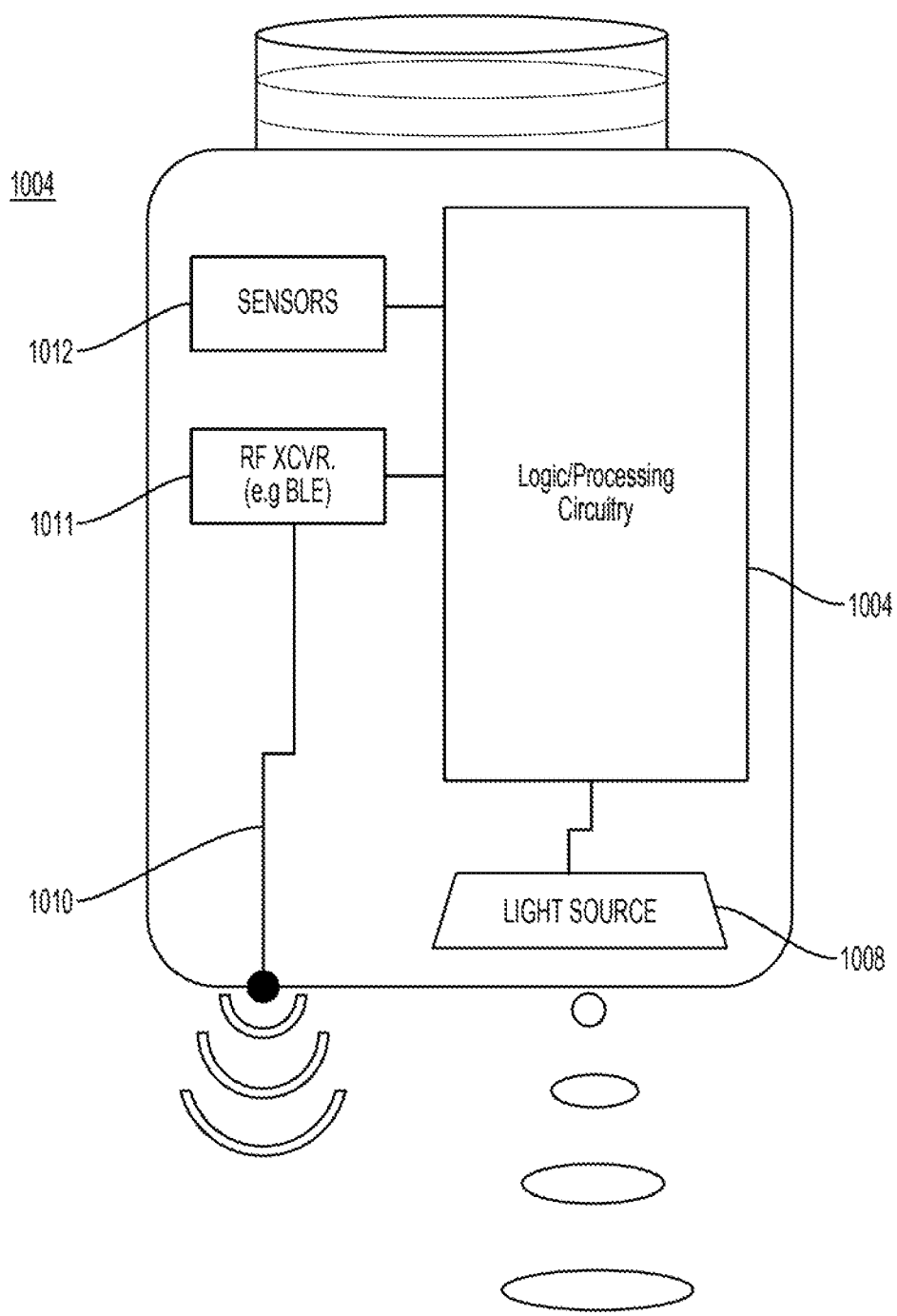
FIG. 10 depicts a simplified block diagram of an RF-enabled lighting device that may be used in system of FIG. 9.
Figure 11:
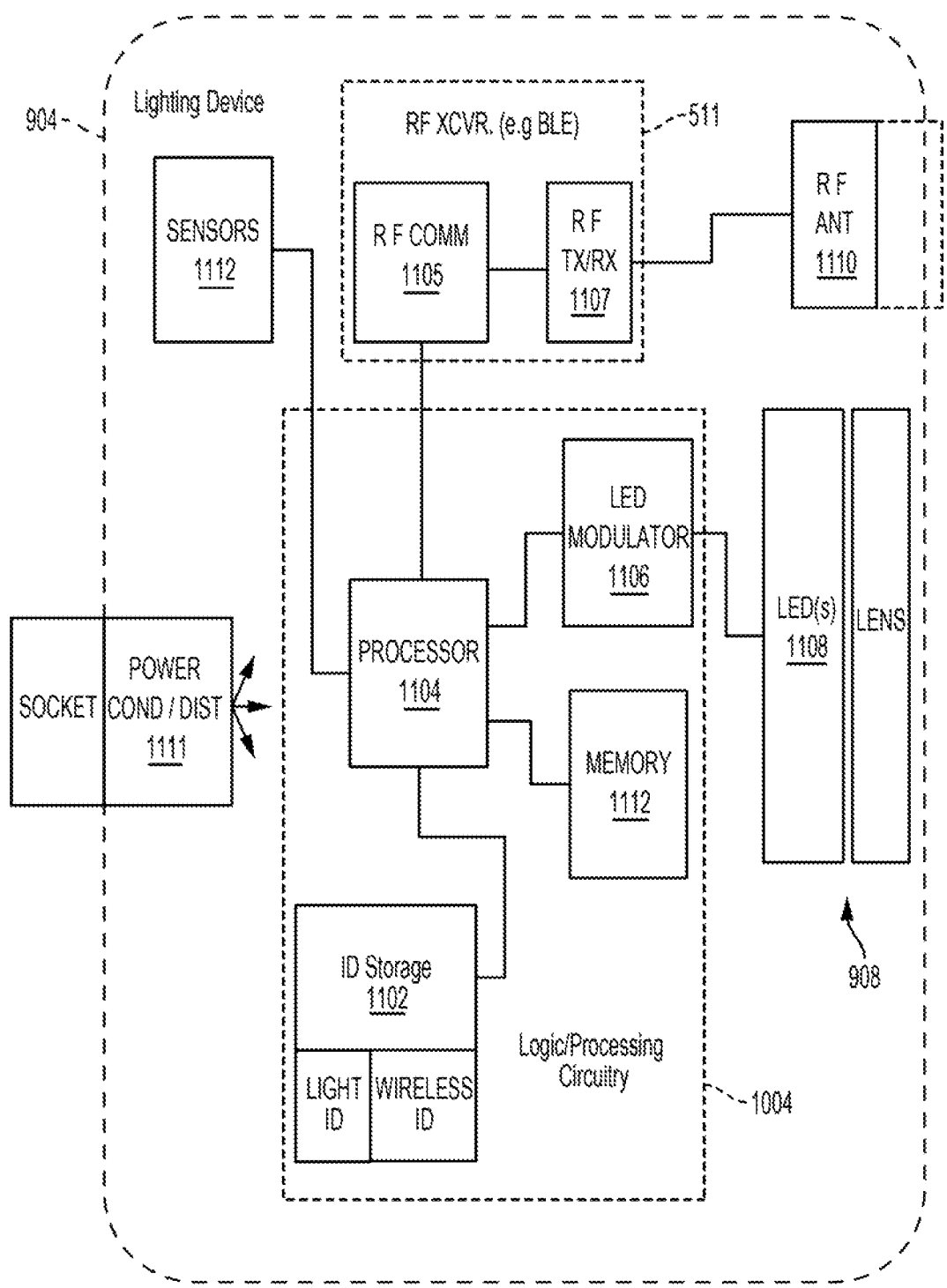
FIG. 11 depicts a more detailed functional block diagram of an example of the lighting device of FIG. 8.

FIGS. 9, 10 and 11 as discussed herein below are implementations of a system of lighting devices that is configured to implement the functional examples described with respect to FIGS. 1-7 as discussed above.

FIG. 9 depicts a configuration of RF enabled modulatable lighting devices arranged in an ad hoc mesh-type network 902 and connected to Internet resources through a nearby gateway router 920. Although not shown, the ad hoc mesh-type network 902 may alternatively be temporarily connected to Internet resources through a nearby mobile device. Modulatable lighting devices 904 may be configured so that a modulated light signal provided from the light emitted from each device 904 may be distinguished from modulated light signals produced by other nearby lighting devices 904 as well as from light outputs from other unmodulated sources or lighting devices (not shown). When such modulating lighting devices 904 are configured with RF capability and form a wireless network they may communicate configuration information from lighting device to lighting device.

A network capability as depicted in FIG. 9 may include access through a mobile device or other RF enabled device to external (non-mesh) networks. In an example where the mobile device temporarily serves as the gateway, software installed on a mobile device that is in contact with a non-mesh communications network (e.g., an app voluntarily installed on a smart phone that is connected to the Internet via WiFi and/or to a cell phone network) facilitates the mobile device to act as a network-to-network gateway. In the example, however, the system 901 includes another suitable network-network gateway 920 installed in the vicinity of one or more of the lighting devices 904 of the system. A network-network gateway 920 in close proximity to one of the networked lighting devices 904 may enable communication from at least one of the lighting devices and thus the network 902 through any suitable wireless networking link such as Ethernet, Zigbee, and the like.

In the example of FIG. 9, a mobile device that may have Bluetooth and WiFi and/or cellular communication capabilities may act as a gateway for communicating data to/from RF enabled, light modulatable lighting devices. If the lighting devices are configured into a network 902 with access via a gateway such as gateway router 900, it may be possible for an Internet resource, such as a position determination server 908, to communicate to a networked lighting devices 904 or 904' by passing data through the Internet 914. This may allow communication of information collected from mobile devices via the RF capability (e.g., identities of devices/users that pass through the area) by one of the lighting devices to a remote server, such as server 908.

Use of mobile devices as gateways between a VLC+RF system and another network (e.g., wireless mesh) may be opportunistic: e.g., mobile devices of customers who have installed an app related to the VLC+RF mesh may be opportunistically enlisted as gateways as the devices move in and out of the mesh's working space. Such a gateway function may be used, for example, to effectively increase the bandwidth of data reporting by mesh nodes to a server/controller, since under various conditions packets can be communicated more quickly through a gateway than through a series of mesh-node retransmissions. Gateway transmission may be used alternatively or additionally to transmission through a mesh controller node connected to a non-mesh network: e.g., upon failure of an external-connection node or device, a mesh may still be enabled to communicate with a server/controller device acting a gateway, carrying on its various functions while calling for diagnosis and repair of the failure.

In various examples, the position determination server 908 is a general-purpose mesh server and controller (back end) that performs functions other than or additional to position determination, issuing commands to the RF and/or lighting capabilities of one or many network nodes, polling network nodes for information garnered from sensors, and so on. A general-purpose back end may be enabled to understand the locations, movements, and other aspects of mobile devices and other assets within the service area of the VLC+RF network mesh.

Illustrative capabilities include inventorying, assisted navigation and reality augmentation, RF asset tag location tracking, robot and drone tracking, time-of-day-based control, real-time user-tailored control of active assets (e.g., video displays), security management, routine customer assistance, emergency assistance, ambience adjustment (e.g., music, lighting, and other environmental adjustments in response to sensed user behaviors), and more. In another example, routine scan (advertising) packet broadcasts from Bluetooth-capable mobile devices are detected by the RF capability of nodes, enabling a mode of position estimation of the mobile device based on received signal strength indication (RSSI) and/or node detection pattern. Such estimates may be combined with estimates based on detection of VLC beacons by a light-sensing capability of the mobile device, e.g., after the device user is prompted to expose their device to light based on detection of their presence by the RF mode.

The configuration server 922 may be implemented as additional programming on the some general purpose computer implementing the position determination server 908. Alternatively, the configuration server 922 may be implemented on a separate network connected general purpose computer platform. Either one or both of the servers 908, 922 may be implemented in a distributed fashion on multiple network connected computers, e.g. to adequately serve a particular traffic load and/or to provide some level of redundant capacity for peak load or for use in the event of a failure of a primary server resource. The master database 924 may be implemented in a storage device of the general purpose computer(s) that implements the server 922 or the server 908, or the master database 924 may be implemented in a network connected storage device accessible to the appropriate general purpose server computer(s).

FIG. 10 is a somewhat schematic illustration and a somewhat block diagram type representation of one of the lighting devices 904; and FIG. 11 is a somewhat more detailed functional block diagram showing possible implementations of several elements of the example of the lighting device 904 of FIG. 9. Reference numbers used in common in both these drawings refer to the same items. For convenience, the description of these examples will refer to both drawings together, unless otherwise noted.

The example of a lighting device 904 in FIGS. 10 and 11 includes logic and/or processing circuitry 1004 to drive and control operations of a light source 1008 and control operations of other elements of the device 904. The light source 1008 may be any suitable device capable of generating light in response to power that can be modulated. In the example of FIG. 11, one or more light emitting diodes (LEDs) 1108 form the light source 1008. The device 904 may include an optical processing element coupled to process the light output from the LEDs 1108 that form the light source 1008. Although other optical processing elements may be used, such as diffusers, reflectors and the like, the example of FIG. 11 shows a lens.

The logic and/or processing circuitry 1004 may include elements such as a secure (possibly encrypted and/or key locked) ID storage 1102, a processor 1104, a modulator (LED modulator 1106 in the example of FIG. 11) to supply and modulate power to the source 1008, and a memory 1112 as a storage device for programming and data. The secure ID storage 1102 may be a separate physical storage device as shown or may be a secure section of the memory 1112.

The secure ID storage 1102 will store at least one unique source address and a unique sequence number currently assigned to the particular lighting device 904, which the processor 1104 uses to control the modulator 1106 so that the lighting output from the LEDs 1108 carries the assigned unique source address and the assigned unique sequence number. At least in some transitional operations, the secure ID storage 1102 may store two lighting device IDs, e.g. a previously assigned source address and the sequence number as well as a newly assigned shifter code stored before replacement/deletion of the previously assigned source address and the sequence number. For RF operations, the lighting device 904 typically will also have one or more wireless ID codes as the unique source address and/or the unique sequence number, which may also be stored secure ID storage 1102. Alternatively, a wireless device ID code as the unique source address and/or the unique sequence number may be burned into or otherwise relatively permanently stored in the applicable RF communication circuitry.

Although the light modulation could be optical and coupled to the output of the source 1008 so as to vary a characteristic of light output before emission thereof to illuminate the premises; in the examples, the logic and/or processing circuitry 1004 varies an aspect of power applied to the light source 1008 to modulate the light generation by the source 1008. In the LED example of the lighting device 904 shown in FIG. 9, the modulator 1106 may be a controllable driver of a capacity appropriate for the number of and type of LEDs 1108 that together form the light source 1008, where the driver circuit forming the modulator 1106 is sufficiently controllable to modulate the light output according to the modulation scheme used by the lighting devices 904 and detectable by the mobile devices 919.

Although purpose built logic circuitry could be used, the processor 1104 typically is implemented by a programmable device such as a microprocessor or a microcontroller, configured to execute programs and process data that facilitate modulation of light from one or more LEDs lighting devices 1108. The ID storage 1102 and memory 1112 may be implemented as separate circuit elements coupled to/accessible by the processor 1104, e.g. if the processor is a microprocessor type device. A microcontroller typically is a 'system on a chip' that includes a central processing unit (CPU) and internal storage; therefore a microcontroller implementation might incorporate the processor 1104, ID storage 1102 and memory 1112 within the microcontroller chip.

The processor 1104 controls the LED modulator 1106 to vary the power applied to drive the LEDs 1108 to emit light. This control capability may allow control of intensity and/or color characteristics of illumination that the source 1008 provides as output of the lighting device 904. Of note for purposes of discussion of position system operations, this control capability causes the modulator 1106 to vary the power applied to drive the LEDs 1108 to cause code modulation of light output of the light output of the source 1008, including modulation to carry a currently assigned source address and the sequence number from the secure storage 1102. The processor and/or modulator may be configured to implement any of a variety of different light modulation techniques. A few examples of light modulation techniques that may be used include amplitude modulation, optical intensity modulation, amplitude-shift keying, frequency modulation, multi-tone modulation, frequency shift keying (FSK), ON-OFF keying (OOK), pulse width modulation (PWM), pulse position modulation (PPM), ternary Manchester encoding (TME) modulation, and digital pulse recognition (DPR) modulation. Other modulation schemes may implement a combination of two or more modulation of these techniques.

As noted, the lighting devices 904 in our examples utilize wireless links to communicate, although other communication media and technologies may be adapted to carry communications discussed herein to and/or from the modulatable lighting devices 904. Hence, our wireless example of FIGS. 10 and 11 includes a radio frequency (RF) wireless transceiver (XCVR) 911 coupled to the logic and/or processing circuitry 1004. The transceiver 911 in turn is coupled to an RF transmit/receive antenna 910 that may facilitate communication over wireless RF signals to and/or from other similarly equipped proximal devices, such as other lighting devices 904, mobile devices 918 or 919, wireless gateway router 920 or other wireless routers or relays, wireless enabled computing devices generally, RF equipped items such as appliances, tools, entertainment devices, RF tags, RF enabled network access points, multi-radio devices, and the like. The RF communication capability offered by transceiver 1011 and the antenna 910 supports the various data communications of the lighting device 904 discussed herein, including those related to source address and the sequence number assignment.

The RF transceiver 1011 may conform to any appropriate RF wireless data communication standard such as wireless Ethernet (commonly referred to as WiFi) or Zigbee. In the example, however, the RF transceiver 1011 is a Bluetooth wireless transceiver, more specifically conforming to the Bluetooth Low Energy (BLE) standard. At a still relatively high level, the BLE transceiver 1011 may include RF communication circuitry 1105 coupled to the processor 1104 and RF transmit (TX) and receive (RX) physical layer circuitry 1107 coupled to the RF transmit/receive antenna 910.

The lighting device 904 of FIGS. 10 and 11 may further include one or more sensors 1012 and 9112 respectively for detecting aspects of the environment, including electromagnetic emissions from nearby computing devices or others of the lighting devices 904. As another class of examples, the sensors 1112 may include one or more feedback sensors for detecting operational parameters of the device 904, such as the temperature and/or intensity or color characteristics of the light outputs of the LEDs 1108. The sensors 1112 may be connected to the processor 1104 to facilitate collection, analysis, and communication of sensor data and/or data derived from the sensor data. Sensors may include ultrasonic sensors, video sensors, audio sensors, image sensors, optical sensors, temperature sensors, humidity sensors, air quality sensors, motion detection sensors, chemical sensors, radio frequency sensors, light intensity sensors, light color characteristic sensors, and the like. While the aforementioned sensor examples are contemplated, so are any other types of sensor that may detect an aspect of an environment into which the lighting device 904 may be deployed.

The lighting device 904 also includes power conditioning and distribution circuitry 1111 coupled to receive power from the power mains provided to the lighting device 904, through a socket connection in the example of FIG. 11. The power conditioning and distribution circuitry 1111 converts the power from the mains to one or more appropriate forms/levels required by the various electronic components of the lighting device 904 and distributes the converted power to those electronic components. Although deriving power from mains is shown and described for convenience, other power sources are contemplated, such as power over data networking, solar power, battery power, etc.

RF communication capabilities typically comply with some network-like standard, such as Bluetooth in our example. A Bluetooth network standard includes unique identifiers for each Bluetooth device that is connected to a wireless network. In a similar way, each RF enabled modulating light 904 may be configured with a unique RF wireless identifier. This RF wireless identifier may be used when determining a position of a properly equipped personal mobile device (e.g., a personal mobile device 919 with an RF capability, a camera capability, and a mobile device application for interacting with at least these two capabilities). The RF wireless identifiers modulated on the RF signals output by the transceiver 1011 and antenna 910 of the lighting devices 904 may be inherent identifiers of the transceivers 1011 e.g. wireless node IDs modulated on beacon or pilot channel signals broadcast by the transceivers 1011 according to the BLE or other applicable wireless standard. In one implementation, a second antenna is optional and may be provided for some examples. Alternatively, the processors 1104 may provide positioning/location system related node IDs to the transceivers 1011 for inclusion in broadcast data messages.

Figure 12:
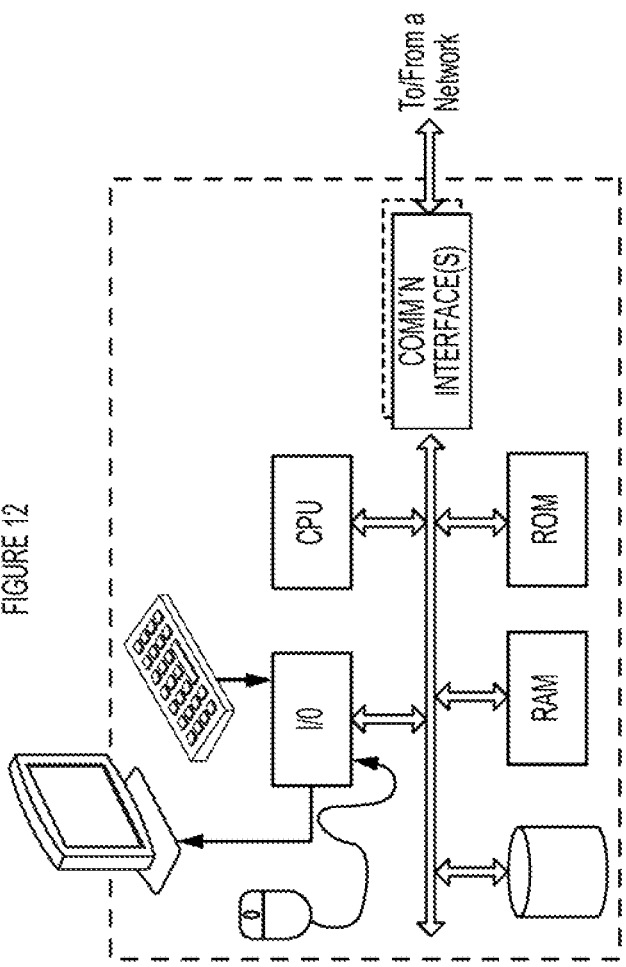
FIG. 12 is a schematic diagram of a number of lighting devices having code modulation and RF wireless communication capabilities.
Figure 13:
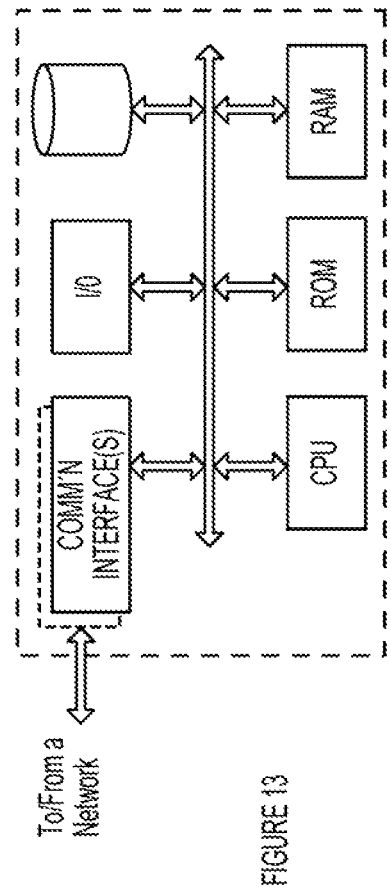
FIG. 13 is a simplified functional block diagram of a computer that may be configured as a processor or server, for example, to function as either of the servers in the system of FIG. 9.

FIGS. 12 and 13 provide functional block diagram illustrations of general purpose computer hardware platforms that may be configured to implement some of the processing examples described with respect to FIGS. 1-9 as discussed above.

Specifically, FIG. 12 illustrates a network or host computer platform, as may typically be used to implement a computer 210 depicted in FIG. 2B or a computer 610 depicted in FIG. 6 or the server 908 and/or server 922 as shown in FIG. 9. Specifically, FIG. 13 depicts a computer with user interface elements, as may be used to implement a personal computer or other type of work station or terminal device, although the computer of FIG. 13 may also act as a server if appropriately programmed. It is believed that those skilled in the art are familiar with the structure, programming and general operation of such computer equipment and as a result the drawings should be self-explanatory.

Hardware of a server computer, for example (FIG. 13), includes a data communication interface for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Hardware of a computer type user terminal device, such as a PC or tablet computer, similarly includes a data communication interface, CPU, main memory and one or more mass storage devices for storing user data and the various executable programs (see FIG. 13).

Aspects of the methods of occupancy detection using a RF wireless communication network, as outlined above, may be embodied in programming in (such as described above FIGS. 12 and 13), e.g. in the form of software, firmware, or microcode executable by a networked computer system such as a server or gateway, and/or a programmable nodal device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, from one computer or processor into another, for example, from a management server or host processor into the computer 210 of the system 200 as shown in FIG. 2B or the computer 610 as shown in FIG. 6 or the server 908 and/or server 922 as shown in the system 901 of FIG. 9. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that include a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may include a software or firmware implementation encoded in any desired language. Programming instructions, when embodied in machine readable medium accessible to a processor of a computer system or device, render computer system or device into a special-purpose machine that is customized to perform the operations specified in the program performed by the computer 210 of the system 200 of FIG. 2B or the computer 610 of the network system 602 of FIG. 6 or the server 908 and/or server 922 as shown in the system 901 of FIG. 9.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is ordinary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
   (a) a radio frequency (RF) wireless communication network (RF network) including a plurality of nodes in an area, each node including a RF transceiver comprising a wireless communication transmitter and a wireless communication receiver, wherein:
      each transmitter is configured to transmit RF spectrum signals at a plurality of times,
      each receiver is configured to receive RF spectrum signals from a transmitter in each of one or more other nodes in the area, at the plurality of times, and
      each receiver is further configured to generate an indicator data of a signal characteristic of received RF spectrum signal propagated in the RF network at each of the plurality of times; and
   (b) a computer coupled to the RF network having access to a parameter of a configuration of the network, wherein the computer is configured to, when each time among the plurality of times is a current time:
      obtain the indicator data of the RF spectrum signal propagated in the network received via the wireless receiver of the RF transceiver,
      determine a modification in the indicator data at the current time from the indicator data at a preceding time among the plurality of times due to a movement of an occupant in the area; and
detect an occupancy condition in the area based on the modification in the indicator data and the parameter.

2. The system of claim 1, wherein:
   one or more of the plurality of nodes is a lighting element including a light source, and
   the occupancy sensing system further comprises a controller coupled to the computer and to the RF network configured to control the light source upon detection of the occupancy condition in the area.

3. The system of claim 1, wherein a change in the RF signal propagation is detected in response to a movement of the occupant in a signal path of the area between the first node and the second node.

4. The system of claim 1, wherein the parameter relates to an aspect of one of a spatial diversity, frequency diversity, polarization diversity, directional diversity, or a combination of two or more thereof.

5. The system of claim 4, wherein:
   the parameter relates to the aspect of spatial diversity, wherein the spatial diversity is a distance between the receiver at a node among the plurality of nodes and the transmitter at the node among the plurality of nodes, and the distance is a non-multiple of a half wavelength of the transmitted RF signal, wherein the RF wireless communication network is configured to utilize the spatial diversity causing the receiver to detect the change in the RF signal propagation.

6. The system of claim 4, wherein:
   the parameter relates to the aspect of frequency diversity, wherein the frequency diversity is a plurality of frequencies at which RF signals are transmitted and received in the RF wireless communication network such that the receiver in a first node among the plurality of nodes receives the RF signal at a first frequency among the plurality of frequencies and the receiver in a second node among the plurality of nodes receives the RF signal at a second frequency among the plurality of frequencies, wherein the first frequency is different from the second frequency.

7. The system of claim 6, wherein the RF wireless communication network is configured to utilize the frequency diversity such that the RF signal propagation detected at the first frequency is different from the RF signal propagation detected at the second frequency resulting in a change in RF signal propagation, wherein the change in RF signal propagation is detected by one of the receiver in the first node at the first frequency, the receiver in the second node at the second frequency or a combination thereof.

8. The system of claim 4, wherein:
   the parameter relates to the aspect of polarization diversity, wherein the polarization frequency is a plurality of various polarizations of the RF signal transmitted by the transmitter in one or more of the nodes among the plurality of nodes with respect to the area, and
   the RF wireless communication network is configured to utilize the polarization diversity such that a movement of the occupant in the area causes a change in the RF signal propagation resulting in change in polarization of the transmitted RF signals received at the one or more of the nodes wherein the changed polarization of the transmitted RF signals is detected by the receiver as the change in the RF signal propagation.

9. The system of claim 4 wherein:
   the parameter relates to the aspect of directionality diversity, wherein the directionality diversity is changing of the transmitter in a plurality of different directions in the nodes with respect to the area, and
   the RF wireless communication network is configured to utilize the directional diversity such that a movement of the occupant in the area causes a change in the RF signal propagation resulting in the switching or changing of the direction of the transmitter towards the occupant such that the changed direction of the transmitter transmits RF signals in the changed direction that are received at the one or more of the nodes, wherein the changed direction of the transmitted RF signals is detected by the receiver as the change in the RF signal propagation.

10. The system of claim 4, wherein:
a node among the plurality of nodes includes two antennas and the parameter relates to the aspect of directional diversity is an angle of arrival (AOA) of the RF signal received by two antennas in the node, wherein the directional diversity is utilized such that such that the change in the RF signal propagation is detected by a modification in phase measurements of the AOA of the received RF signal by the two antennas.

11. The system of claim 1, wherein the indicator data is one of a relative signal strength indicator (RSSI) data, bit error rate data, packet error rate data, or a phase change data, or a combination of two or more thereof.

12. A method comprising:
accessing a parameter of a configuration of a radio frequency (RF) wireless communication network in an area, wherein the RF wireless network comprises a plurality of nodes;
during each of a plurality of times:
transmitting RF spectrum signals from the plurality of nodes of the RF wireless communication network; and
obtaining indicator data of the RF spectrum signal propagated in the network, from a RF receiver in at least one of the plurality of nodes of the RF wireless communication network; and
when each time among the plurality of times is a current time:
determining a modification in the indicator data at the current time from the indicator data at a preceding time among the plurality of times responsive to a movement of an occupant in the area; and
detecting an occupancy condition in the area based on the modification in the indicator data and the parameter.

13. The method of claim 12 further comprising controlling a light source in the RF network based upon the detecting of the occupancy condition in the area.

14. The method of claim 12 wherein the modification in the indicator data is based on a change in the RF signal propagation detected in response to movement of the occupant in a signal path of the area.

15. The method of claim 14 wherein the parameter relates to an aspect of one of a spatial diversity, frequency diversity, polarization diversity, directional diversity and combination of two or more thereof.

16. The method of claim 15 further comprising utilizing the parameter relating to the aspect of spatial diversity such that a distance between a transmitter at a node among the plurality of nodes and a receiver at the node among the plurality of nodes is a non-multiple of half wavelength of the transmitted RF signal causing the receiver to determine the change in the RF signal propagation, wherein a second node is different from a first node.

17. The method of claim 15 further comprising utilizing the parameter relating to the aspect of frequency diversity such that a first receiver at a first node among of plurality of nodes receives the RF signal at a first frequency among a plurality of frequencies and a second receiver in a second node among the plurality of nodes receives the RF signal at a second frequency among the plurality of frequencies, wherein the first frequency is different from the second frequency, wherein the one of the first receiver, the second receiver or combination of the first and the second receiver determines the change in the RF signal propagation due to the received RF signal at the first and the second frequency.

18. The method of claim 15 further comprising utilizing the parameter relating to the aspect of polarization diversity such that the movement of the occupant in the area causes the change in the RF signal propagation resulting in change in polarization of the transmitted RF signals received by a receiver at the one or more of the plurality of the nodes wherein the changed polarization of the transmitted RF signal is detected by the receiver as the change in the RF signal propagation.

19. The method of claim 15 further comprising utilizing the parameter relating to the aspect of directional diversity such that a movement of the occupant in the area causes a change in the RF signal propagation resulting in the switching or changing of the direction of a transmitter towards the occupant such that the changed direction of the transmitter transmits RF signals in the changed direction that are received at the one or more of the plurality of the nodes, wherein the changed direction of the transmitted RF signals is detected by the receiver as the change in the RF signal propagation.

20. The method of claim 12 wherein the indicator data is one of a relative signal strength indicator (RSSI) data, bit error rate data, packet error rate data, or a phase change data, or a combination of two or more thereof.

* * * * *